(12) United States Patent
Pomering et al.

(10) Patent No.: US 12,514,341 B2
(45) Date of Patent: Jan. 6, 2026

(54) CONNECTOR

(71) Applicant: MIPS AB, Täby (SE)

(72) Inventors: Amy Louise Pomering, Täby (SE); Patrik Binkowski, Täby (SE)

(73) Assignee: MIPS AB, Täby (SE)

( * ) Notice: Subject to any disclaimer, the term of this patent is extended or adjusted under 35 U.S.C. 154(b) by 386 days.

(21) Appl. No.: 18/270,469

(22) PCT Filed: Jan. 4, 2022

(86) PCT No.: PCT/EP2022/050071
§ 371 (c)(1),
(2) Date: Jun. 29, 2023

(87) PCT Pub. No.: WO2022/148748
PCT Pub. Date: Jul. 14, 2022

(65) Prior Publication Data
US 2024/0057728 A1   Feb. 22, 2024

(30) Foreign Application Priority Data

Jan. 5, 2021   (GB) ...................................... 2100076

(51) Int. Cl.
*A44B 17/00*   (2006.01)
*A41D 13/05*   (2006.01)
*A42B 3/04*   (2006.01)

(52) U.S. Cl.
CPC .......... *A44B 17/0041* (2013.01); *A41D 13/05* (2013.01); *A42B 3/0406* (2013.01)

(58) Field of Classification Search
CPC .. A44B 17/0041; A41D 13/05; A42B 3/0406; A42B 3/064
See application file for complete search history.

(56) References Cited

U.S. PATENT DOCUMENTS

| 10,529,207 | B1 * | 1/2020 | Yang ................... E05B 73/0029 |
| 2009/0038196 | A1 * | 2/2009 | Grassia ..................... B42F 1/00 402/8 |
| 2020/0046057 | A1 * | 2/2020 | Shaffer .................... A42B 3/14 |

FOREIGN PATENT DOCUMENTS

| WO | 2001/045526 A1 | 6/2001 |
| WO | 2011/139224 A1 | 11/2011 |

(Continued)

*Primary Examiner* — David M Upchurch
(74) *Attorney, Agent, or Firm* — Husch Blackwell LLP

(57) ABSTRACT

There is provided a connector for connecting first and second parts of an apparatus, comprising: a first part; a second part, opposing the first part; and two, or more, arms extending between the first part and the second part connecting the first part and the second part, the arms being formed from a deformable material and configured to deform to allow the first part and the second part to slide relative to each other at a low friction interface; the first part comprising a first sliding surface; the second part comprising a second sliding surface, opposing the first sliding surface, the low friction interface being provided between the first and second sliding surfaces; the first part comprising a first attachment part on a side of the first sliding surface opposite to the second sliding surface, configured to connect the first sliding surface to the first part of the apparatus; the second part comprising a second attachment part on a side of the second sliding surface opposite to the first sliding surface, configured to connect the second sliding surface to the second part of the apparatus.

20 Claims, 14 Drawing Sheets

(56) References Cited

FOREIGN PATENT DOCUMENTS

WO      2017/148958 A1    9/2017
WO      2020/115063 A1    6/2020

\* cited by examiner

CONNECTOR

RELATED APPLICATIONS

This application is a 35 USC § 371 National Stage application of International Application No. PCT/EP2022/050071, entitled "CONNECTOR," filed on Jan. 4, 2022, which claims the benefit of United Kingdom Patent Application No. 2100076.5, filed Jan. 5, 2021, which are hereby incorporated by reference herein in their entirety

TECHNICAL FIELD

The present invention relates to a connector for connecting first and second parts of an apparatus.

BACKGROUND ART

Impact protection apparatuses generally aim to reduce the energy transferred to an object, such as a person to be protected, by an impact. This may be achieved by energy absorbing means, energy redirecting means, or a combination thereof. Energy absorbing means may include energy absorbing materials, such as a foam materials, or structures configured to deform elastically and/or plastically in response to an impact. Energy redirecting means may include structures configured to slide, shear or otherwise move in response to an impact.

Impact protection apparatuses include protective apparel for protecting a wearer of the apparel. Protective apparel comprising energy absorbing means and/or energy redirecting means is known. For example, such means are implemented extensively in protective headgear, such as helmets.

Examples of helmets comprising energy absorbing means and energy redirecting means include WO 2001/045526 and WO 2011/139224 (the entirety of which are herein incorporated by reference). Specifically, these helmets include at least one layer formed from an energy absorbing material and at least one layer that can move relative to the head of the wearer of the helmet under an impact.

Implementing moving parts in a protective apparatus has challenges. For example, connecting two layers of an apparatus in such a way that permits enough relative movement between parts of the apparatus under an impact but maintains the structural integrity of the apparatus can be challenging. Ensuring that the connector can be manufactured and assembled relatively easily can be challenging.

It is the aim of the present invention to provide a connector and an apparatus comprising the connector that at least partially address some of the problems discussed above.

Implementing moving parts in an apparatus has challenges. For example, ensuring that friction between moving parts under an impact can be overcome to allow enough relative movement between parts can be challenging. Ensuring that the apparatus can be manufactured relatively easily can be challenging.

It is the aim of the present invention to provide a helmet that at least partially addresses some of the problems discussed above.

SUMMARY OF THE INVENTION

According to a first aspect of the invention, there is provided a connector for connecting first and second parts of an apparatus, comprising: a first part; a second part, opposing the first part; and two, or more, arms extending between the first part and the second part connecting the first part and the second part, the arms being formed from a deformable material and configured to deform to allow the first part and the second part to slide relative to each other at a low friction interface; the first part comprising a first sliding surface; the second part comprising a second sliding surface, opposing the first sliding surface, the low friction interface being provided between the first and second sliding surfaces; the first part comprising a first attachment part on a side of the first sliding surface opposite to the second sliding surface, configured to connect the first sliding surface to the first part of the apparatus; the second part comprising a second attachment part on a side of the second sliding surface opposite to the first sliding surface, configured to connect the second sliding surface to the second part of the apparatus.

Optionally, the two or more arms are formed from different pieces of deformable material and are joined to the first part of the connector and to the second part of the connector.

Alternatively to the option above, the two or more arms may be formed from a single piece of deformable material, and may be joined to each other by a joining portion of the deformable material respective ends at the first part of the connector. Optionally, the arms are joined to the second part of the connector at respective ends at the second part of the connector. Alternatively, the two or more arms may be joined to each other by a joining portion of the deformable material also respective ends at the second part of the connector, forming a loop of the deformable material.

Optionally, at least one of the first part and the second part of the connector are formed in two sections, respectively arranged either side of a portion of the deformable material forming the arms, for connection thereto, a first section comprising the sliding surface and a second section comprising the attachment part. Optionally, the two sections are connected by adhesive. Alternatively, the two sections may be connected by a mechanical connection. Optionally, the mechanical connection is a snap-fit connection.

Optionally, at least one of the first part and the second part of the connector comprises a channel configured to accommodate a portion of the deformable material forming the arms, for connection thereto.

Optionally, at least one of the first part and the second part of the connector comprises a protrusion configured to protrude though a portion of the deformable material forming the arms, for connection thereto. Optionally, the protrusion forms part of the attachment part.

Optionally, at least one of the first and second sliding surfaces has a substantially circular or substantially equilateral shape.

Optionally, at least one of the first and second sliding surfaces has a substantially elongate shape.

Optionally, the first and second parts are substantially the same size. Alternatively, the first and second parts may be substantially different sizes.

Optionally, at least one of the first and second attachment parts forms part of a hook and loop connection.

Optionally, at least one of the first and second attachment parts forms part of a mechanical connection. Optionally, the mechanical connection is a snap-fit connection.

According to a second aspect of the invention, there is provided an apparatus comprising: a first part; a second part; and the connector of the first aspect, connecting the first part and the second part.

Optionally, the first and second part of the apparatus are configured to move relative to each other, said relative movement being enabled by the first part and the second part of the connector sliding relative to each other.

Optionally, at least one of the first part and the second part of the apparatus comprises a protective layer, optionally an energy absorbing layer or a hard shell, configured to protect against an impact to the apparatus. Optionally, one of the first and second parts comprises an interface layer configured to interface with an object or person to be protected.

Optionally, the apparatus is a helmet. Alternatively, the apparatus may be body armour.

BRIEF DESCRIPTION OF THE DRAWINGS

The invention is described in detail below, with reference to the accompanying figures, in which.

DETAILED DESCRIPTION

It should be noted that the Figures are schematic, the proportions of the thicknesses of the various layers, and/or of any gaps between layers, depicted in the Figures have been exaggerated for the sake of clarity and can of course be adapted according to need and requirements.

Although the examples described below relate to helmets, it should be understood that the invention applies generally to protective apparatuses, including other types headgear and other protective apparel.

Protective apparatuses can be understood to have parts corresponding to the parts of the helmets described below. For example, protective apparatuses may have a layered structure corresponding to the layered structure of the described helmets.

Terms that are specific to a helmet, such as "radial direction" can be understood to have equivalents in the context of other protective equipment, such as "thickness direction". A "wearer" is to generally understood as corresponding to an object that is to be protected by the protective apparatus, and "head" as a specific part of the object, e.g. a different body part, with which the apparatus is in contact.

General features of the example helmets are described below with reference to FIGS. 1 to 7.

FIGS. 1 to 7 show example helmets 1 comprising an energy absorbing layer 3. The purpose of the energy absorbing layer 3 is to absorb and dissipate energy from an impact in order to reduce the energy transmitted to the wearer of the helmet. Within the helmet 1, the energy absorbing layer may be the primary energy absorbing element. Although other elements of the helmet 1 may absorb that energy to a more limited extent, this is not their primary purpose.

The energy absorbing layer 3 may absorb energy from a radial component of an impact more efficiently than a tangential component of an impact. The term "radial" generally refers to a direction substantially toward the centre of the wearers head, e.g. substantially perpendicular to an outer surface of the helmet 1. The term "tangential" may refer to a direction substantially perpendicular to the radial direction, in a plane comprising the radial direction and the impact direction.

The energy absorbing layer may be formed from an energy absorbing material, such as a foam material. Preferable such materials include expanded polystyrene (EPS), expanded polypropylene (EPP), expanded polyurethane (EPU), vinyl nitrile foam; or strain rate sensitive foams such as those marketed under the brand-names Poron™ and D3O™.

Alternatively, or additionally, the energy absorbing layer may have a structure that provides energy absorbing characteristics. For example, the energy absorbing layer may comprise deformable elements, such as cells or finger-like projections, that deform upon impact to absorb and dissipate the energy of an impact.

Figure 6:
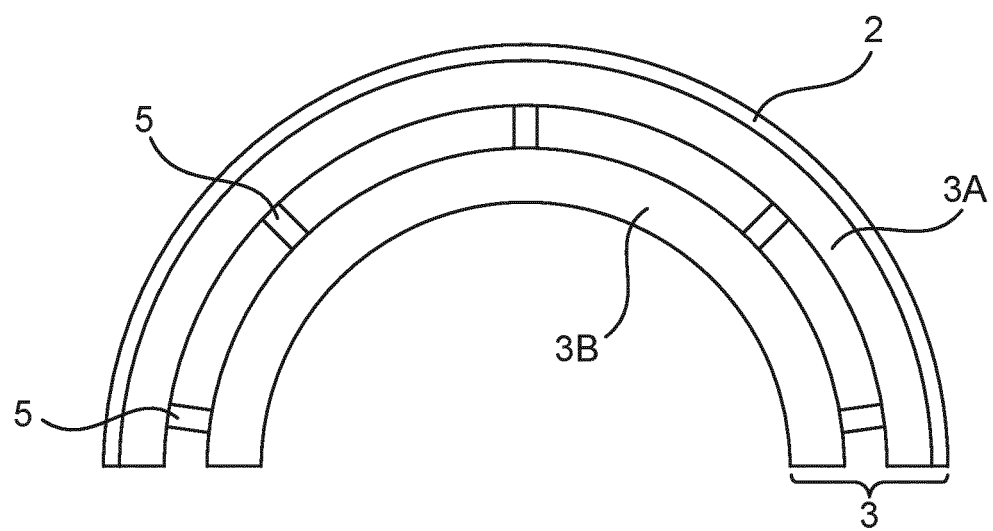
FIG. 6 schematically shows a cross-section through a sixth example helmet.

As illustrated in FIG. 6, the energy absorbing layer 3 of the helmet 1 is divided into outer and inner parts 3A, 3B.

The energy absorbing layer is not limited to one specific arrangement or material. The energy absorbing layer 3 may be provided by multiple layers having different arrangements, i.e. formed from different materials or having different structures. The energy absorbing layer 3 may be a relatively thick layer. For example, it may be thickest layer of the helmet 1.

FIGS. 1 to 7 show example helmets 1 comprising an outer layer 2. The purpose of the outer layer 2 may be to provide rigidity to the helmet. This may help spread the impact energy over a larger area of the helmet 1. The outer layer 2 may also provide protection against objects that might pierce the helmet 1. Accordingly, the outer shell may be a relatively strong and/or rigid layer, e.g. compared to an energy absorbing layer 3. The outer layer 2 may be a relatively thin layer, e.g. compared to an energy absorbing layer 3.

The outer layer 2 may be formed from a relatively strong and/or rigid material. Preferable such materials include a polymer material such as polycarbonate (PC), polyvinylchloride (PVC) or acrylonitrile butadiene styrene (ABS) for example. Advantageously, the polymer material may be fibre-reinforced, using materials such as glass-fibre, Aramid, Twaron, carbon-fibre and/or Kevlar.

Figure 7:
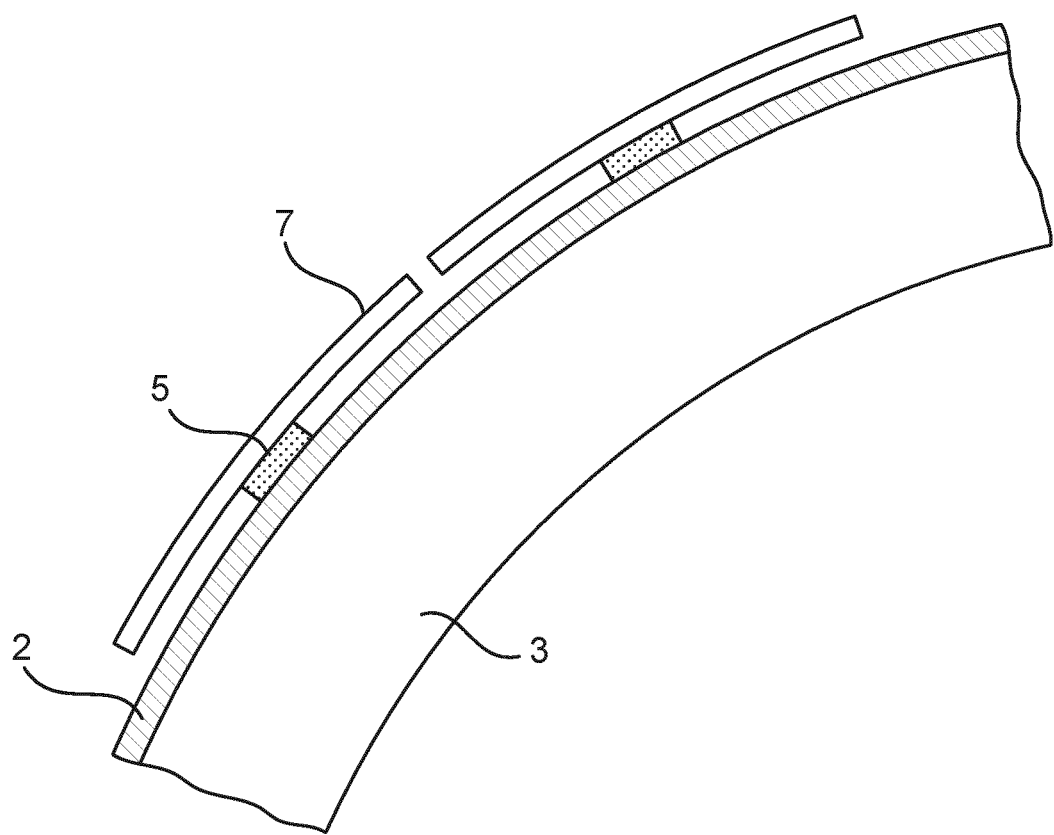
FIG. 7 schematically shows a cross-section through a seventh example helmet.

As shown in FIG. 7, one or more outer plates 7 may be mounted to the outer layer 2 of the helmet 1. The outer plates 7 may be formed from a relatively strong and/or rigid material, for example from the same types of materials as from which the outer layer 2 may be formed. The selection of material used to form the outer plates 7 may be the same as, or different from, the material used to form the outer layer 2.

In some example helmets, the outer layer 2 and/or the energy absorbing layer 3 may be adjustable in size in order to provide a customised fit. For example the outer layer 2 may be provided in separate front and back parts. The relative position of the front and back parts may be adjusted to change the size of the outer layer 2. In order to avoid gaps in the outer layer 2, the front and back parts may overlap. The energy absorbing layer 3 may also be provided in separate front and back parts. These may be arranged such that the relative position of the front and back parts may be adjusted to change the size of the energy absorbing layer 3. In order to avoid gaps in the energy absorbing layer 3, the front and back parts may overlap.

FIGS. 1 to 4 shows example helmets 1 comprising an interface layer 4. Although not shown in FIGS. 5 to 7, these example helmets may also comprise an interface layer 4. The purpose of interface layer 4 may be to provide an interface between the helmet and the wearer. In some arrangements, this may improve the comfort of the wearer. The interface layer 4 may be provided to mount the helmet on the head of a wearer. The interface layer 4 may be provided as a single part or in multiple sections.

The interface layer 4 may be configured to at least partially conform to the head of the wearer. For example, the interface layer 4 may be elasticated and/or may comprise an adjustment mechanism for adjusting the size of the interface layer 4. In an arrangement, the interface layer may engage with the top of a wearer's head. Alternatively or additionally, the interface layer 4 may comprise an adjustable band configured to encircle the wearer's head.

The interface layer 4 may comprise comfort padding 4A. Multiple sections of comfort padding 4A may be provided. The comfort padding 4A may be provided on a substrate 4B for mounting the comfort padding to the rest of the helmet 1.

The purpose of the comfort padding 4A is to improve comfort of wearing the helmet and/or to provide a better fit. The comfort padding may be formed from a relatively soft material, e.g. compared to the energy absorbing layer 3 and/or the outer layer 2. The comfort padding 4A may be formed from a foam material. However, the foam material may be of lower density and/or thinner than foam materials used for the energy absorbing layer 3. Accordingly, the comfort padding 4A will not absorb a meaningful amount of energy during an impact, i.e. for the purposes of reducing the harm to the wearer of the helmet. Comfort padding is well recognised in the art as being distinct from energy absorbing layers, even if they may be constructed from somewhat similar materials.

The interface layer 4, and/or comfort padding 4A that may be part of it, may be removable. This may enable the interface layer 4 and/or comfort passing 4A to be cleaned and/or may enable the provision of an interface layer and/or comfort padding 4A that is configured to fit a specific wearer.

Straps, e.g. chin straps, may be provided to secure the helmet 1 to the head of the wearer.

The helmets of FIGS. 1 to 4 are configured such that the interface layer 4 is able to move, for example slide, in a tangential direction relative to the energy absorbing layer 3 in response to an impact. As shown in FIGS. 1 to 4, the helmet may also comprise connectors between the energy absorbing layer 3 and the interface layer 4 that allow relative movement between the energy absorbing layer 3 and the interface layer 4 while connecting the elements of the helmet together.

Figure 5:
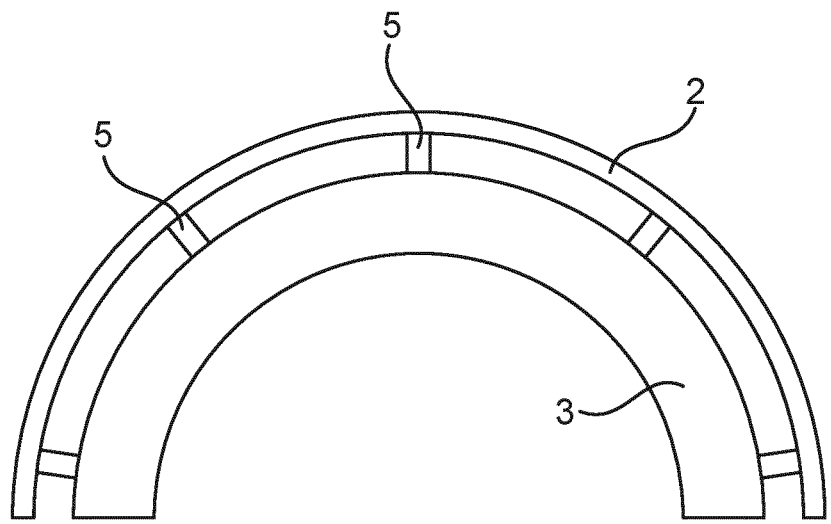
FIG. 5 schematically shows a cross-section through a fifth example helmet.

The helmet of FIG. 5 is configured such that the outer layer 2 is able to move, for example slide, in a tangential direction relative to the energy absorbing layer 3 in response to an impact. As shown in FIG. 5, the helmet 1 may also comprise connectors 5 between the energy absorbing layer 3 and the outer layer 2 that allow relative movement between the energy absorbing layer 3 and the outer layer 2 while connecting the elements of the helmet together.

The helmet of FIG. 6 is configured such that the outer part 3A of the energy absorbing layer 3 is able to move, for example slide, in a tangential direction relative to the inner part 3B of the energy absorbing layer 3 in response to an impact. As shown in FIG. 6, the helmet 1 may also comprise connectors 5 between the outer part 3A of the energy absorbing layer 3 and the inner part 3B of the energy absorbing layer 3, that allow relative movement between the outer part 3A of the energy absorbing layer 3 and the inner part 3B of the energy absorbing layer 3, while connecting the elements of the helmet together.

The helmet of FIG. 7 is configured such that the outer plates 8 are able to move, for example slide, in a tangential direction relative to the outer layer 2 in response to an impact. As shown in FIG. 7, the helmet may also comprise connectors 5 between the outer plates 8 and the outer layer 2 that allow relative movement between the outer plates 7 and the outer layer 2, while connecting the elements of the helmet together.

The purpose of helmet layers that move or slide relative to each other may be to redirect energy of an impact that would otherwise be transferred to the head the wearer. This may improve the protection afforded to the wearer against a tangential component of the impact energy. A tangential component of the impact energy would normally result in rotational acceleration of the head of the wearer. It is well know that such rotation can cause brain injury. It has been shown that helmets with layers that move relative to each other can reduce the rotational acceleration of the head of the wearer. A typical reduction may be roughly 25% but reductions as high as 90% may be possible in some instances.

Preferably, relative movement between helmet layers results in a total shift amount of at least 0.5 cm between an outermost helmet layer and an inner most helmet layer, more preferably at least 1 cm, more preferably still at least 1.5 cm. Preferably the relative movement can occur in any direction, e.g. in a circumferential direction around the helmet, left to right, front to back and any direction in between.

Regardless of how helmet layers are configured to move relative to each other, it is preferable that the relative movement, such as sliding, is able to occur under forces typical of an impact for which the helmet is designed (for example an impact that is expected to be survivable for the wearer). Such forces are significantly higher than forces that a helmet may be subject to during normal use. Impact forces tend to compress layers of the helmet together, increasing the reaction force between components and thus increasing frictional forces. Where helmets are configured to have layers sliding relative to each other the interface between them may need to be configured to enable sliding even under the effect of the high reaction forces experienced between them under an impact.

As shown in FIGS. 1 to 7, a sliding interface may be provided between the layers of the helmet 1 that are configured to slide relative to each other. At the sliding interface, surfaces slide against each other to enable relative sliding between the layers of the helmet 1. The sliding interface may be a low friction interface. Accordingly, friction reducing means may be provided at the sliding interface. Example sliding interfaces are described further below, in relation to each of the example helmets 1 shown in FIGS. 1 to 7.

The friction reducing means may be a low friction material or lubricating material. These may be provided as a continuous layer, or multiple discrete patches, or portions of material, for example. Possible low friction materials for the friction reducing means include waxy polymers such as PC, PTFE, ABS, PVC, Nylon, PFA, EEP, PE and UHMWPE, Teflon™, a woven fabric such as Tamarack™, a non-woven fabric, such a felt. Such low friction materials may have a thickness of roughly 0.1-5 mm, but other thicknesses can also be used, depending on the material selected and the performance desired. Possible lubricating materials include oils, polymers, microspheres, or powders. Combinations of the above may be used.

In one example the low friction material or lubricating material may be a polysiloxane-containing material. In particular the material may comprise (i) an organic polymer, a polysiloxane and a surfactant; (i) an organic polymer and a copolymer based on a polysiloxane and an organic polymer; or (iii) a non-elastomeric cross-linked polymer obtained or obtainable by subjecting a polysiloxane and an organic polymer to a cross-linking reaction. Preferred options for such materials are described in WO2017148958.

In one example the low friction material or lubricating material may comprise a mixture of (i) an olefin polymer, (ii) a lubricant, and optionally one or more further agents. Preferred options for such materials are described in WO2020115063.

In one example the low friction material or lubricating material may comprise an ultra high molecular weight (UHMW) polymer having a density of ≤960 kg/m$^3$, which UHMW polymer is preferably an olefin polymer. Preferred options for such materials are described in WO2020115063.

In one example the low friction material or lubricating material may comprise a polyketone.

In some arrangements, it may be desirable to configure the low friction interface such that the static and/or dynamic coefficient of friction between materials forming sliding surfaces at the sliding interface is between 0.001 and 0.3 and/or below 0.15. The coefficient of friction can be tested by standard means, such as standard test method ASTM D1894.

The friction reducing means may be provided on or be an integral part of one or both of the layers of the helmet 1 that are configured to slide relative to each other. In some examples, helmet layers may have a dual function, including functioning as a friction reducing means. Alternatively, or additionally, the friction reducing means may be a separate from the layers of the helmet 1 that are configured to slide relative to each other, but provided between the layers.

Instead of the sliding interface, in some examples, a shearing interface may be provided between the layers of the helmet 1 that are configured to move relative to each other. At the shearing interface, a shearing layer shears to enable relative movement between the layers of the helmet 1. The shearing layer may comprise a gel or liquid, which may be retained within a flexible envelope. Alternatively, the shearing layer may comprise two opposing layers connected by deformable elements that deform to enable shearing between the two opposing layers.

A single shearing layer may be provided that substantially fills the volume between two layers of a helmet. Alternatively, one or more shearing layers may be provided that fill only a portion of the volume between two layers of a helmet, e.g. leaving substantial space around the shearing layers. The space may comprise a sliding interface, as described above. As such, helmets may have a combination of shearing and sliding interfaces. Such shearing layers may act as connectors 5, which are described further below.

FIGS. 1 to 7 schematically show connectors 5. The connectors 5 are configured to connect two layers of the helmet while enabling relative movement, e.g. sliding or shearing, between the layers. Different numbers of connectors 5 may be provided than as shown in FIGS. 1 to 7. The connectors 5 may be located at different positions than as shown in FIGS. 1 to 7, for example at a peripheral edge of the helmet 1 instead of a central portion.

Typically, a connector 5 comprises first and second attachment parts respectively configured to attach to first and second parts of the helmet and a deformable part between the first and second attachment parts that enables the first and second attachment parts to move relative to each other to enable movement between the first and second parts of the helmet of the helmet. Connectors 5 may absorb some impact energy by deforming.

The specific arrangements of each of the example helmets shown in FIGS. 1 to 7 are described below.

Figure 1:
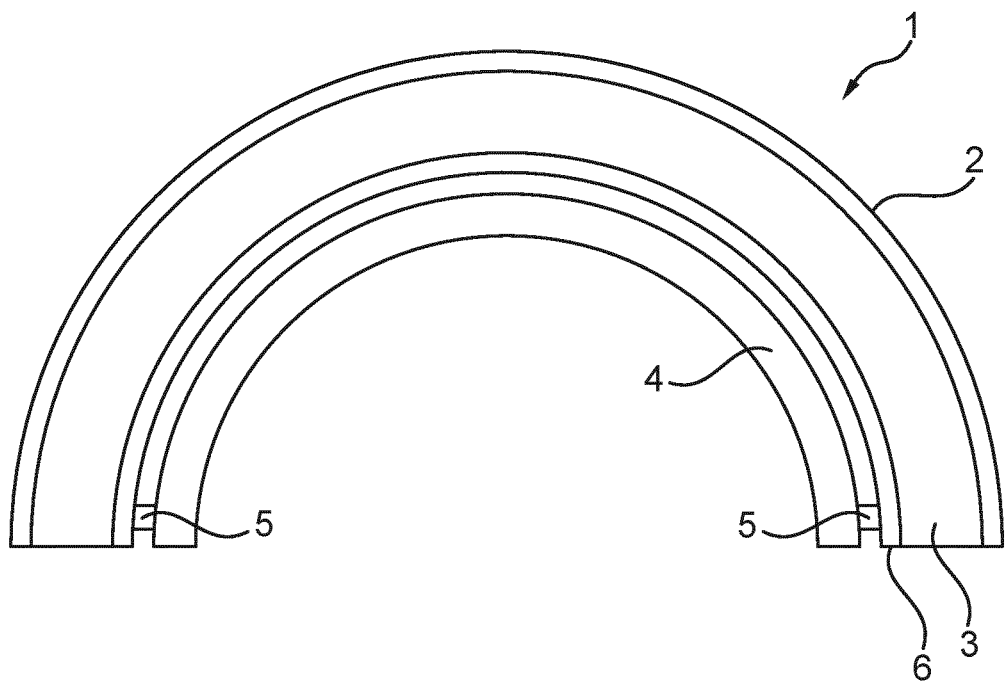
FIG. 1 schematically shows a cross-section through a first example helmet.

FIG. 1 shows a helmet comprising an outer layer 2, an energy absorbing layer 3 and an interface layer 4. The interface layer 4 is provided as a single layer and comprises comfort padding.

The helmet of FIG. 1 is configured such that the interface layer 4 is able to slide relative to the energy absorbing layer 3 in response to an impact. A sliding interface is provided between the interface layer 4 and the energy absorbing layer 3.

A sliding layer 7 is provided on a surface of the energy absorbing layer 3 facing the sliding interface. The sliding layer 7 may be moulded to the energy absorbing layer 3 or otherwise attached thereto. The sliding layer 7 may be formed from a relatively hard material, e.g. relative to the energy absorbing layer 3. The sliding layer 7 is configured to provide friction reducing means to reduce the friction at the sliding interface. This may be achieved by forming the sliding layer 7 from a low friction material, such as PC, PTFE, ABS, PVC, Nylon, PFA, EEP, PE and UHMWPE. Alternatively, or additionally, this may be achieved by applying a low friction coating to the sliding layer 7, and/or applying a lubricant to the sliding layer 7.

Alternatively or additionally, friction reducing means, to reduce the friction at the sliding interface, may be provided by forming the energy absorbing layer 3 from a low friction material, by applying a low friction coating to the energy absorbing layer 3 and/or applying a lubricant to the energy absorbing layer 3.

The helmet 1 shown in FIG. 1 also comprises connectors 5 attached to the interface layer 4. The connectors are also connected to the sliding layer 7 to allow relative sliding between the energy absorbing layer 3 and the interface layer 4. Alternatively, or additionally, one or more of the connectors 5 may be connected to another part of the remainder of the helmet 1, such as the energy absorbing layer 3 or the outer shell 2. The connectors 5 may also be connected to two or more parts of the remainder of the helmet 1.

It should be understood that such an arrangement of the energy absorbing layer 3 and the interface layer 4 may be added to any helmet described herein.

Figure 2:
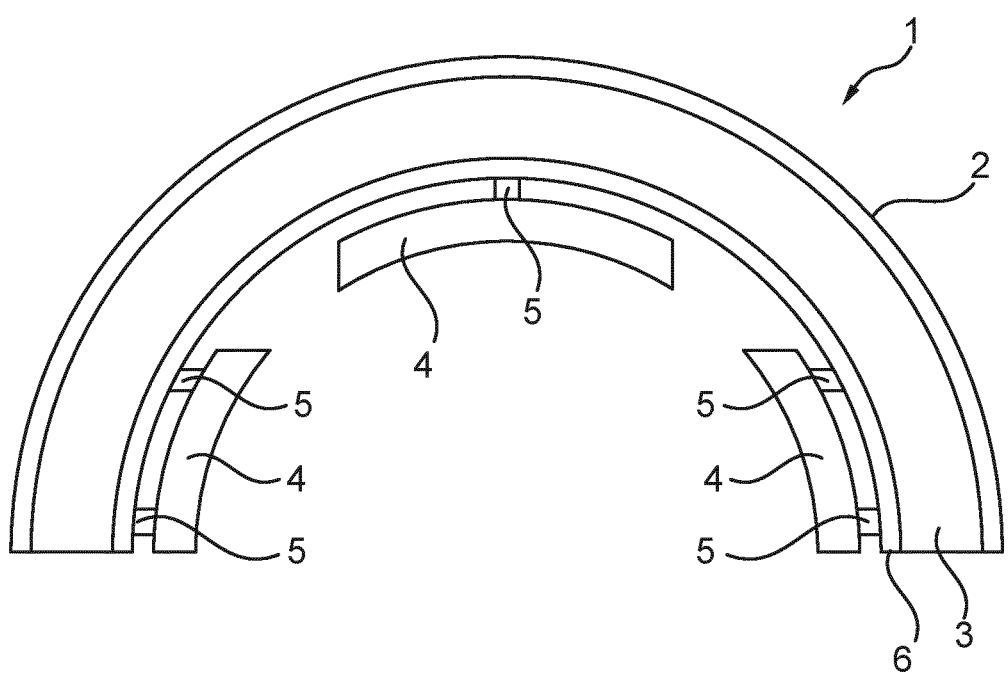
FIG. 2 schematically shows a cross-section through a second example helmet.

FIG. 2 shows a helmet comprising an outer layer 2, an energy absorbing layer 3 and an interface layer 4. The interface layer 4 is provided as a plurality of independent sections each comprising comfort padding.

The helmet of FIG. 2 is configured such that the section of the interface layer 4 are able to slide relative to the energy absorbing layer 3 in response to an impact. A sliding interface is provided between the sections of the interface layer 4 and the energy absorbing layer 3.

An sliding layer 7 is provided on a surface of the energy absorbing layer 3 facing the sliding interface. The sliding layer 7 may be moulded to the energy absorbing layer 3 or otherwise attached thereto. The sliding layer 7 may be formed from a relatively hard material, e.g. relative to the energy absorbing layer 3. The sliding layer 7 is configured to provide friction reducing means to reduce the friction at the sliding interface. This may be achieved by forming the sliding layer 7 from a low friction material, such as PC, PTFE, ABS, PVC, Nylon, PFA, EEP, PE and UHMWPE. Alternatively, or additionally, this may be achieved by applying a low friction coating to the sliding layer 7, and/or applying a lubricant to the sliding layer 7.

Alternatively or additionally, friction reducing means, to reduce the friction at the sliding interface, may be provided by forming the energy absorbing layer 3 from a low friction material, by applying a low friction coating to the energy absorbing layer 3 and/or applying a lubricant to the energy absorbing layer 3.

The helmet 1 shown in FIG. 2 also comprises connectors 5 attached to each independent section of the interface layer 4. The connectors 5 are also attached to the sliding layer 7 to allow relative sliding between the energy absorbing layer 3 and the sections of the interface layer 4. Alternatively or additionally, one or more of the connectors 5 may be connected to another part of the remainder of the helmet 1, such as the energy absorbing layer 3 or the outer shell 2. The connectors 5 may also be connected to two or more parts of the remainder of the helmet 1.

It should be understood that such an arrangement of the energy absorbing layer 3 and the interface layer 4 may be added to any helmet described herein.

Figure 3:
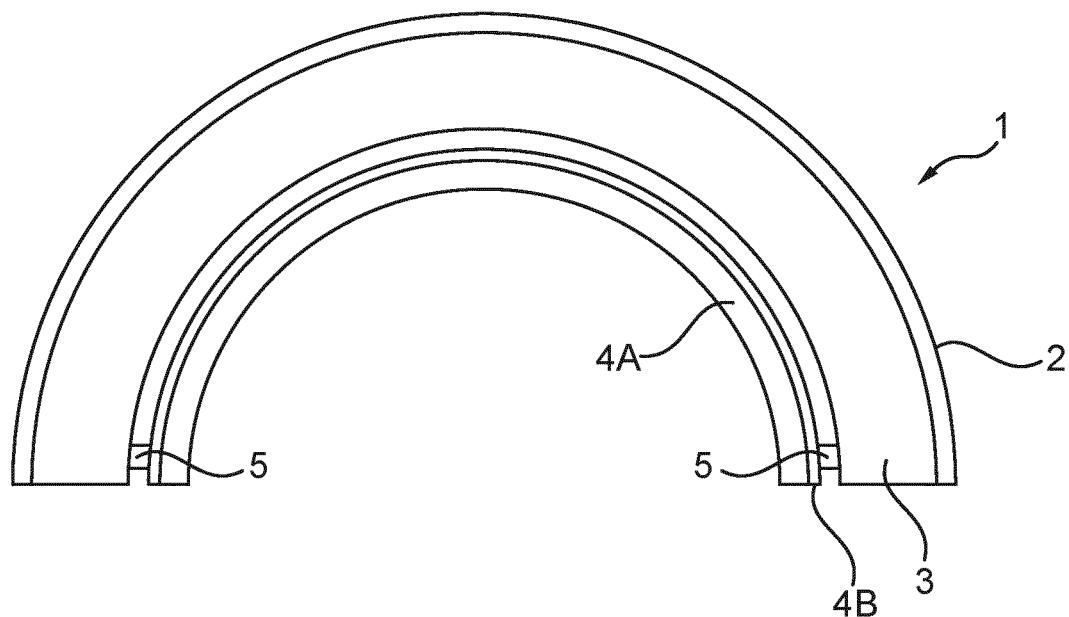
FIG. 3 schematically shows a cross-section through a third example helmet.

FIG. 3 shows a helmet comprising an outer layer 2, an energy absorbing layer 3 and an interface layer 4. The interface layer 4 is provided as a single layer and comprises comfort padding 4A attached to a substrate 4B. The substrate 4B may be bonded to the outer side of the comfort padding 4A. Such bonding could be through any means, such as by adhesive or by high frequency welding or stitching.

The helmet of FIG. 3 is configured such that the interface layer 4 is able to slide relative to the energy absorbing layer 3 in response to an impact. A sliding interface is provided between the interface layer 4 and the energy absorbing layer 3.

The substrate 4B of the interface layer 4 faces the sliding interface. The substrate 4B may be formed from a relatively hard material, e.g. relative to the energy absorbing layer 3 and/or the comfort padding 4A. The substrate 4B is configured to provide friction reducing means to reduce the friction at the sliding interface. This may be achieved by forming the substrate 4B from a low friction material, such as PC, PTFE, ABS, PVC, Nylon, PFA, EEP, PE and UHMWPE. Alternatively, or additionally, this may be achieved by applying a low friction coating to the substrate 4B, and/or applying a lubricant to the substrate 4B. In alternative example, the substrate 4B may be formed from a fabric material, optionally coated with a low friction material.

Alternatively or additionally, friction reducing means, to reduce the friction at the sliding interface, may be provided by forming the energy absorbing layer 3 from a low friction material, by applying a low friction coating to the energy absorbing layer 3 and/or applying a lubricant to the energy absorbing layer 3.

The helmet 1 shown in FIG. 3 also comprises connectors 5 attached to the interface layer 4. The connectors are also connected to the energy absorbing layer to allow relative sliding between the energy absorbing layer 3 and the interface layer 4. Alternatively, or additionally, one or more of the connectors 5 may be connected to another part of the remainder of the helmet 1, such as the outer shell 2. The connectors 5 may also be connected to two or more parts of the remainder of the helmet 1

It should be understood that such an arrangement of the energy absorbing layer 3 and the interface layer 4 may be added to any helmet described herein.

Figure 4:
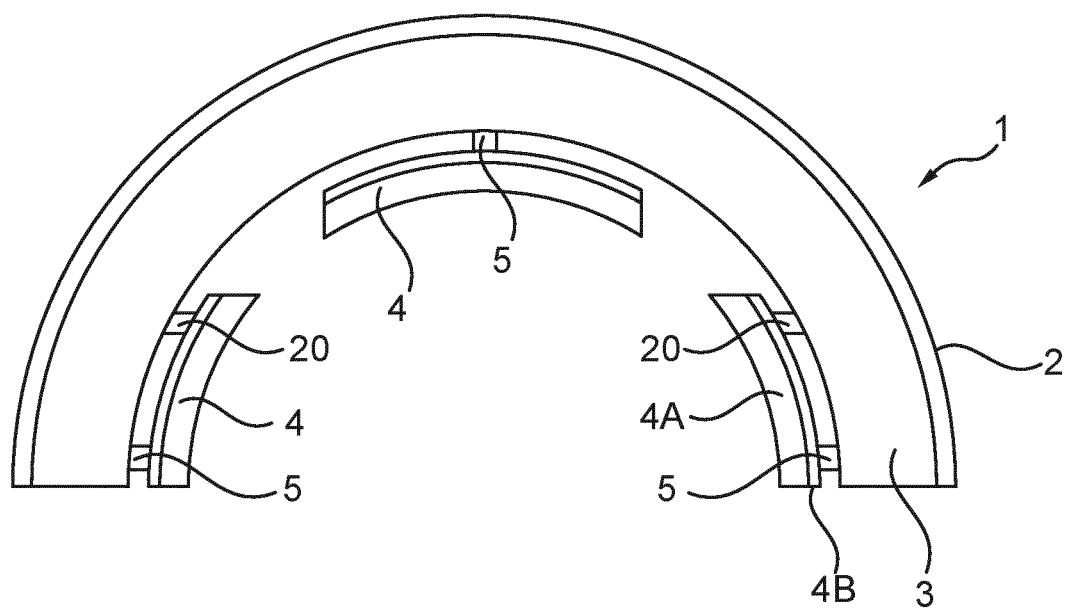
FIG. 4 schematically shows a cross-section through a fourth example helmet.

FIG. 4 shows a helmet comprising an outer layer 2, an energy absorbing layer 3 and an interface layer 4. The interface layer 4 is provided as a plurality of independent sections each comprising comfort padding 4A attached to a substrate 4B. The substrate 4B may be bonded to the outer side of the comfort padding 4A. Such bonding could be through any means, such as by adhesive or by high frequency welding or stitching.

The helmet of FIG. 4 is configured such that the interface layer 4 is able to slide relative to the energy absorbing layer 3 in response to an impact. A sliding interface is provided between the interface layer 4 and the energy absorbing layer 3.

The substrate 4B of the sections of the interface layer 4 faces the sliding interface. The substrate 4B may be formed from a relatively hard material, e.g. relative to the energy absorbing layer 3 and/or the comfort padding 4A. The substrate 4B is configured to provide friction reducing means to reduce the friction at the sliding interface. This may be achieved by forming the substrate 4B from a low friction material, such as PC, PTFE, ABS, PVC, Nylon, PFA, EEP, PE and UHMWPE. Alternatively, or additionally, this may be achieved by applying a low friction coating to the substrate 4B, and/or applying a lubricant to the substrate 4B. In alternative example, the substrate 4B may be formed from a fabric material, optionally coated with a low friction material.

Alternatively or additionally, friction reducing means, to reduce the friction at the sliding interface, may be provided by forming the energy absorbing layer 3 from a low friction material, by applying a low friction coating to the energy absorbing layer 3 and/or applying a lubricant to the energy absorbing layer 3.

The helmet 1 shown in FIG. 4 also comprises connectors 5 attached to the sections of the interface layer 4. The connectors 5 are also connected to the energy absorbing layer 3 to allow relative sliding between the energy absorbing layer 3 and the interface layer 4. Alternatively, or additionally, one or more of the connectors 5 may be connected to another part of the remainder of the helmet 1, such as the outer shell 2. The connectors 5 may also be connected to two or more parts of the remainder of the helmet 1

It should be understood that such an arrangement of the energy absorbing layer 3 and the interface layer 4 may be added to any helmet described herein.

FIG. 5 shows a helmet comprising an outer layer 2 and an energy absorbing layer 3. Although not shown, an interface layer may additionally be provided.

The helmet of FIG. 5 is configured such that the outer layer 2 is able to slide relative to the energy absorbing layer 3 in response to an impact. A sliding interface may be provided between the outer layer 2 and the energy absorbing layer 3

Although not shown, an additional layer may be provided on a surface of the energy absorbing layer 3 facing the sliding interface. The additional layer may be moulded to the energy absorbing layer 3 or otherwise attached thereto. The additional layer may be formed from a relatively hard material, e.g. relative to the energy absorbing layer 3. The additional layer may be configured to provide friction reducing means to reduce the friction at the sliding interface. This may be achieved by forming the additional layer from a low friction material, such as PC, PTFE, ABS, PVC, Nylon, PFA, EEP, PE and UHMWPE. Alternatively, or additionally, this may be achieved by applying a low friction coating to the additional layer and/or applying a lubricant to the additional layer.

Alternatively or additionally, friction reducing means, to reduce the friction at the sliding interface, may be provided by forming the outer layer 2 from a low friction material, providing an additional low friction layer on a surface of the outer layer 2 facing the sliding interface, by applying a low friction coating to the outer layer 2 and/or applying a lubricant to the outer layer 2.

The helmet 1 shown in FIG. 5 also comprises connectors 5 attached to the outer layer 2. The connectors 5 are also attached to the energy absorbing layer 3 (or additional layer) to allow relative sliding between the energy absorbing layer 3 and the sections of the interface layer 4. Alternatively or additionally, one or more of the connectors 5 may be connected to another part of the remainder of the helmet 1, such as an interface layer. The connectors 5 may also be connected to two or more parts of the remainder of the helmet 1.

It should be understood that such an arrangement of the outer shell 2 and the energy absorbing layer 3 may be added to any helmet described herein.

FIG. 6 shows a helmet comprising an outer layer 2 and an energy absorbing layer 3. As illustrated, the energy absorbing layer 3 of the helmet shown in FIG. 6 is divided into outer and inner parts 3A, 3B. Although not shown, an interface layer may additionally be provided.

The helmet of FIG. 6 is configured such that the outer part 3A of the energy absorbing layer 3 is able to slide relative to the inner part 3B of the energy absorbing layer 3 in response to an impact. A sliding interface may be provided between the outer part 3A of the energy absorbing layer 3 and the inner part 3B of the energy absorbing layer 3.

Although not shown, an additional layer may be provided on a surface of one or both of the inner and outer parts 3A, 3B of the energy absorbing layer 3 facing the sliding interface. The additional layer may be moulded to the inner or outer parts 3A, 3B of the energy absorbing layer 3 or otherwise attached thereto. The additional layer may be formed from a relatively hard material, e.g. relative to the energy absorbing layer 3. The additional layer may be configured to provide friction reducing means to reduce the friction at the sliding interface. This may be achieved by forming the additional layer from a low friction material, such as PC, PTFE, ABS, PVC, Nylon, PFA, EEP, PE and UHMWPE. Alternatively, or additionally, this may be achieved by applying a low friction coating to the additional layer and/or applying a lubricant to the additional layer.

Alternatively or additionally, friction reducing means, to reduce the friction at the sliding interface, may be provided by forming one or both of the inner and outer parts 3A, 3B of the energy absorbing layer 3 from a low friction material, providing an additional low friction layer on a surface of the inner and outer parts 3A, 3B of the energy absorbing layer 3 facing the sliding interface, by applying a low friction coating to the inner and outer parts 3A, 3B of the energy absorbing layer 3 and/or applying a lubricant to the inner and outer parts 3A, 3B of the energy absorbing layer 3.

The helmet 1 shown in FIG. 6 also comprises connectors 5 attached to the outer layer 2. The connectors 5 are also attached to the energy absorbing layer 3 (or additional layer) to allow relative sliding between the energy absorbing layer 3 and the sections of the interface layer 4. Alternatively or additionally, one or more of the connectors 5 may be connected to another part of the remainder of the helmet 1, such as an interface layer. The connectors 5 may also be connected to two or more parts of the remainder of the helmet 1.

It should be understood that such an arrangement of inner and outer parts 3A 3B of the energy absorbing layer 3 may be added to any helmet described herein.

FIG. 7 shows a helmet comprising an outer layer 2 and an energy absorbing layer 3. As shown in FIG. 7, one or more outer plates 7 are mounted to the outer layer 2 of the helmet 1. The outer plates 7 may be formed from a relatively strong and/or rigid material, for example from the same types of materials as from which the outer layer 2 may be formed. Although not shown, an interface layer may additionally be provided.

The helmet of FIG. 7 is configured such that the outer plates 8 are able to slide relative to the outer layer 2 in response to an impact. A sliding interface may be provided between the outer plates 8 and the outer layer 2.

Friction reducing means, to reduce the friction at the sliding interface, may be provided by forming the outer layer 2 and/or the outer plates 8 from a low friction material, providing an additional low friction layer on a surface of the outer layer 2 and/or the outer plates 8 facing the sliding interface, by applying a low friction coating to the outer layer 2 and/or the outer plates 8, and/or applying a lubricant to the outer layer 2 and/or the outer plates 8.

The helmet 1 shown in FIG. 7 also comprises connectors 5 attached to the outer plates 7 The connectors 5 are also attached to the outer layer 2 to allow relative sliding between the plates 7 and the outer layer 2. Alternatively or additionally, one or more of the connectors may be connected to another part of the remainder of the helmet 1, such as the energy absorbing layer 3. The connectors 5 may also be connected to two or more parts of the remainder of the helmet 1.

In such an arrangement, in the event of an impact on the helmet 1, it can be expected that the impact would be incident on one or a limited number of the outer plates 17. Therefore, by configuring the helmet such that the one or more outer plates 7 can move relative to the outer layer 2 and any outer plates 7 that have not been subject to an impact, the surface receiving the impact, namely one or a limited number of outer plates 7, can move relative to the remainder of the helmet 1. In the case of an impact, this may reduce the rotational acceleration of the head of a wearer.

It should be understood that such an arrangement of outer plates 7 may be added to any helmet described herein, namely an arrangement having a sliding interface between at least two of the layers of the helmet 1.

Some helmets, such as those shown in FIGS. 1 to 6, are configured to cover a top portion of the head and the above described helmet structures are appropriately located in the helmet to cover a top portion of the head. For example, a helmet may be provided to substantially cover the forehead, top of the head, back of the head and/or temples of the wearer. The helmet may substantially cover the cranium of the wearer.

Figure 8:
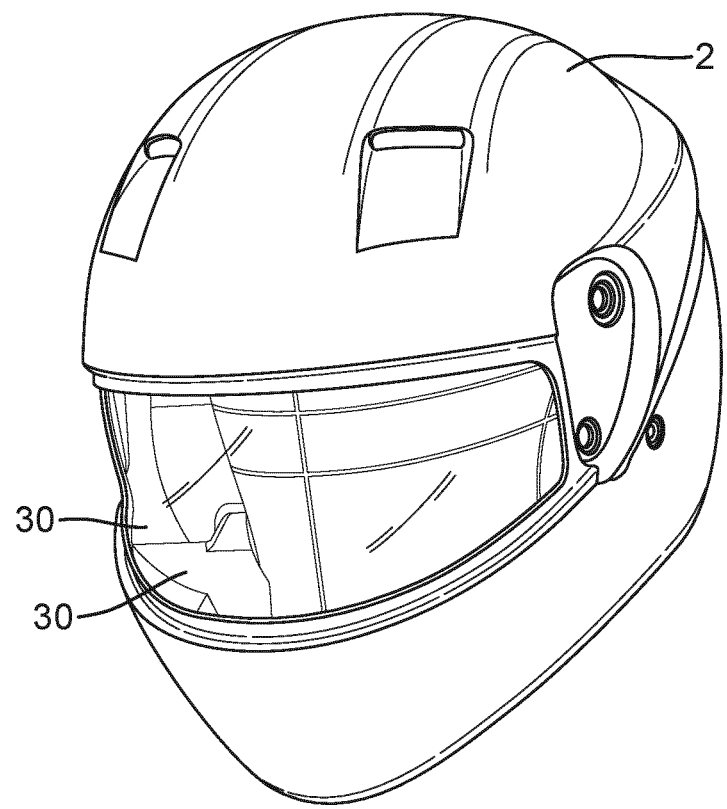
FIG. 8 shows an eighth example helmet.

Some helmets may be configured to cover other parts of the head, alternatively or additionally to a top portion. For example, helmets such as the helmet shown in FIG. 8 may cover the cheeks and/or chin of the wearer. Such helmets may be configured to substantially cover the jaw of the wearer. Helmets of the type shown in FIG. 8, are often referred to as full-face helmets. As shown in FIG. 8, cheek pads 30 may be provided on either side of the helmet 1 (i.e. left and right sides). The cheek pads 30 may be arranged within an outer shell 2 of the helmet 1 to protect the side of the face of the wearer from an impact.

The cheek pads 30 may have the same layered structure as the example helmets described above. For example, the cheek pads 30 may comprise one or more energy absorbing layers as described above, and/or an interface layer as described above, and/or layers that move relative to each other as described above, optionally, layers may be connected by connectors as described above. Alternatively or additionally, the cheek pads 30 themselves may be configured to move relative to the outer shell 2 and, optionally be connected to the outer shell by connectors as described above.

Helmets as described above may be used in various activities. These activities include combat and industrial purposes, such as protective helmets for soldiers and hardhats or helmets used by builders, mine-workers, or operators of industrial machinery for example. Helmets, are also common in sporting activities. For example, protective helmets may be used in ice hockey, cycling, motorcycling, motor-car racing, skiing, snow-boarding, skating, skateboarding, equestrian activities, American football, baseball, rugby, soccer, cricket, lacrosse, climbing, golf, airsoft, roller derby and paintballing.

Examples of injuries that may be prevented or mitigated by the helmets described above include Mild Traumatic Brain Injuries (MTBI) such as concussion, and Severe Traumatic Brain Injuries (STBI) such as subdural haematomas (SDH), bleeding as a consequence of blood vessels rapturing, and diffuse axonal injuries (DAI), which can be summarized as nerve fibres being over stretched as a consequence of high shear deformations in the brain tissue.

Figure 9:
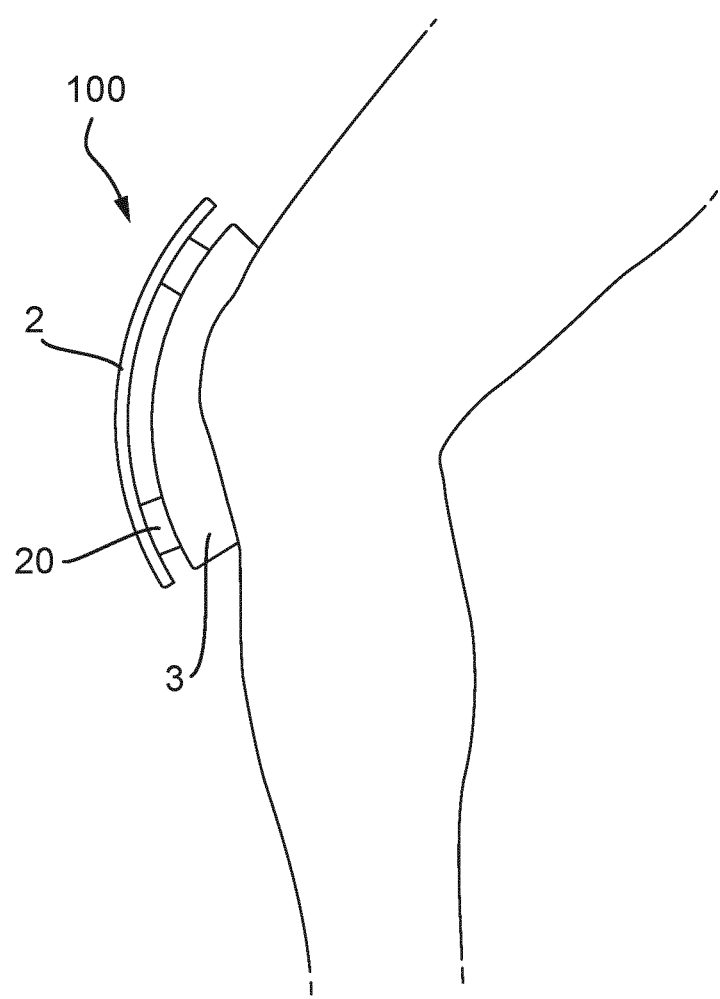
FIG. 9 shows a first example of body armour.
Figure 10:
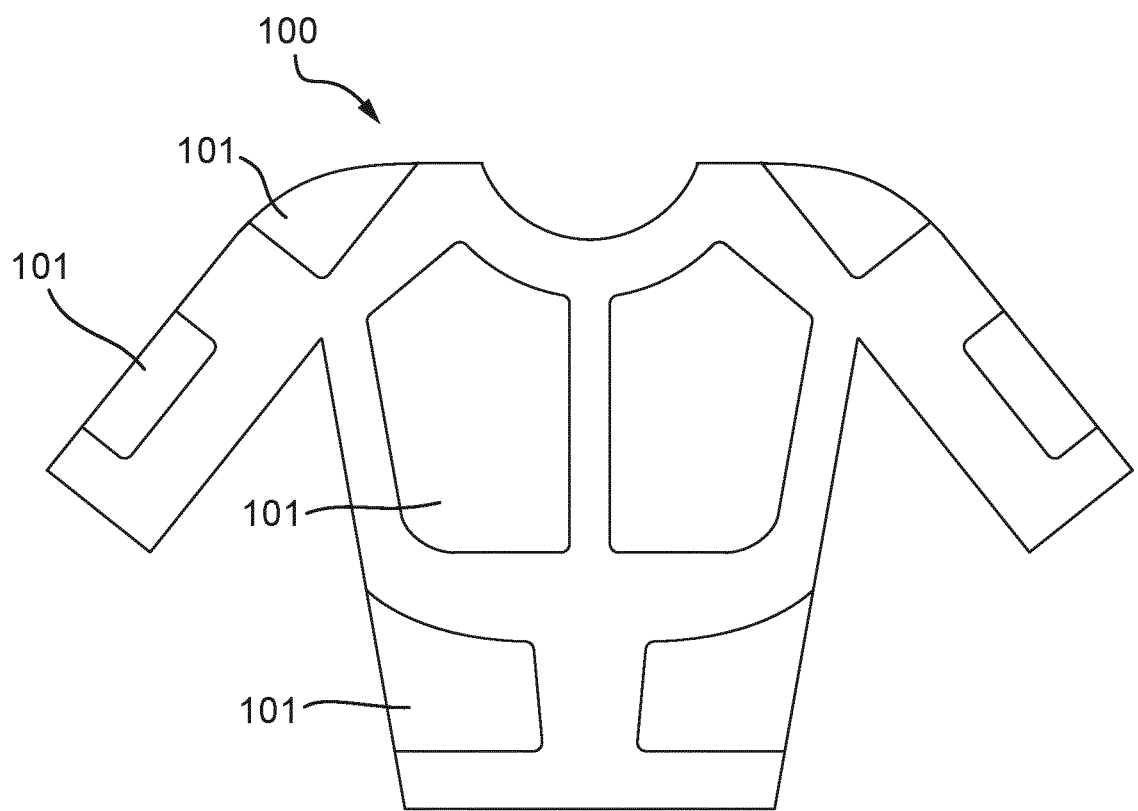
FIG. 10 shows a second example of body armour.

Although, the above examples relate to helmets, as stated above, the disclosure may also relate to alternative protective apparel, such as body armour, as shown in FIGS. 9 and 10. Body armour 100 may provide protection for other parts of the body, such as the shins, knees, thighs, forearms, elbows, upper arms, shoulders, chest and back. Individual items of body armour may be provided to protect individual body parts (as shown in FIG. 9), or alternatively may be combined in apparel comprising multiple armoured regions 101 to protect more than one body part (as shown in FIG. 10). Such body armour 100 may be worn for the same activities as helmets, discussed above, including for combat, sports, and motorcycling.

The body armour 100 may have the same layered structure as the example helmets described above. For example, the body armour 100 may comprise an outer shell 2 as described above, one or more energy absorbing layers 3 as described above, and/or an interface layer as described above, and/or layers that move relative to each other as described above, and/or layers may be connected by connectors 5 as described above.

Depending on the characteristics of the rotational component of an impact, such as the duration, amplitude and rate of increase, either concussion, SDH, DAI or a combination of these injuries can be suffered. Generally speaking, SDH occur in the case of accelerations of short duration and great amplitude, while DAI occur in the case of longer and more widespread acceleration loads.

Connectors that may be used within a helmet are described below. It should be appreciated that these connectors may be used in a variety of contexts and are not to be limited to use within helmets. For example, they may be used in other apparatuses that provide impact protection, such as body armour or padding for sports equipment.

It should be appreciated that the connectors may be used for connecting any two parts of an apparatus together. In the context of helmets, it should be appreciated in particular that the connectors may be used for connecting any two parts of helmets, such as those discussed above that are configured to move relative to each other.

Where a connector is described as having a first part connected to a first part of an apparatus and a second part connected to a second part of an apparatus, it should be appreciated that, with suitable modifications, this may be reversed. It should also be appreciated that where an apparatus has first and second parts connected by plural connectors, the plural connectors need not have the same configuration as each other.

Figure 11:
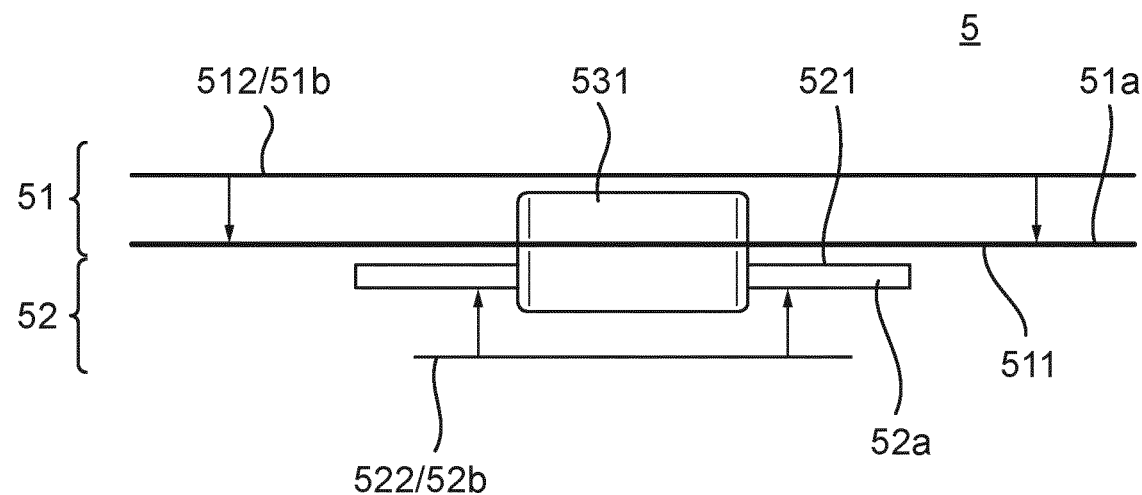
FIGS. 11 and 12 show a first example connector.
Figure 12:
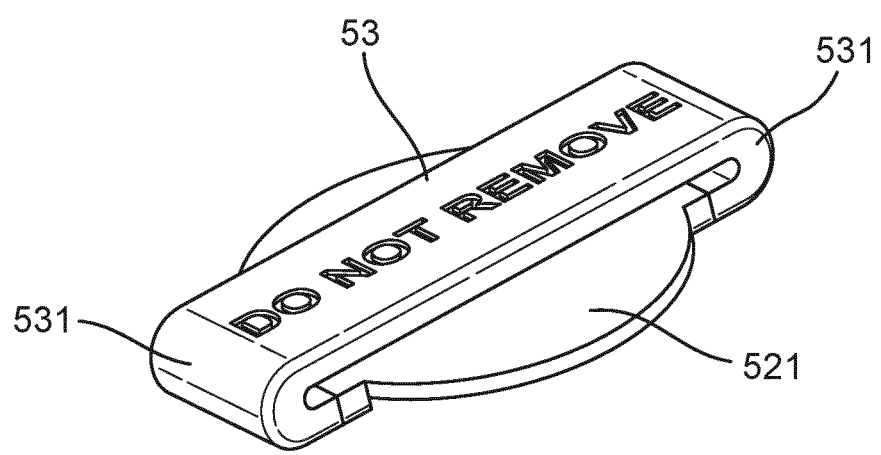

FIGS. 11 and 12 show a first example connector 5. The connector 5 comprises a first part 51 and a second part 52, opposing the first part 51, for connecting to respective parts of an apparatus.

The connector 5 further comprises two (or more) arms 531 extending between the first part 51 and the second part 52. The arms connect the first part 51 and the second part 52. The arms are formed from a deformable material 53 and may be configured to deform to allow the first part 51 and the second part 52 to slide relative to each other at a low friction interface. Connecting two parts of the connector 5 in this way may provide a secure, movable connection with a relatively small amount of material and relatively simple manufacturing requirements.

As shown in FIGS. 11 and 12, the arms 531 may have a substantially C-shaped portion. That is to say the arms 531 may comprise first and third portions that are substantially parallel and a second portion there between that is curved. The curved portion in particular, may extend between the first part 51 and the second part 52. Alternative shapes may be used in alternative examples, for example S-shapes.

The deformable material 53 forming the arms 531 may be silicone, for example. However, alternative deformable materials, e.g. elastomeric, materials may be used in alternative examples.

As shown in FIG. 12, which shows part of the connector of FIG. 11, the two (or more) arms 531 may be formed from a single piece of deformable material 53. The arms 531 may be joined to each other at an end at the first part of the connector 51 by a joining portion of the deformable material 53. In such an arrangement, the joined ends of the arms are not free ends of the deformable material 53, but are ends of the portions of the deformable material extending between the first and second parts 51, 52 of the connector 5, forming each of the arms 531. The exact positons of the joined ends is not particularly important and could be located at any point on the single piece of deformable material 53 located at the first part 51 of the connector. Forming the connector 5 in this way may further simplify manufacture of the connector 5.

As shown in FIG. 12, the above arrangement may be embodied by a strip, or band, of deformable material 53, curved as described above at either end.

As shown in FIG. 12, the arms 531 may be joined to the second part 52 of the connector 5 at an end at the second part of the connector 52. In this case, the ends of the arms 531 are free ends of the deformable material 53. These joined ends may be joined to the second part of the connector in any suitable way. In some preferable examples, the deformable material 53 forming the arms 531 may be integrated, e.g. co-moulded with the second part of the connector 52. In other examples, the arms 531 may be joined to the second part of the connector 52 by an adhesive. Forming the connector 5 in this way simplify assembly of the connector 5.

As shown in FIG. 12, the above arrangement may be embodied by a loop formed from the deformable material 53 and the second part of the connector 52. This loop may form a single unit, to be connected to the first part of the connector 51. The loop may be substantially flat, in other words longer in a direction parallel to the sliding surfaces 511, 512 than in the depth direction perpendicular thereto. The loop may also be substantially narrow, i.e. longer in the extension direction of the arms than in their width direction. Forming the connector 5 in this way may provide a relatively compact connector 5 that can be relatively easily integrated within in an apparatus.

As shown in FIG. 11, the first part of the connector 51 comprises a first sliding surface 511 and the second part of the connector 52 comprises a second sliding surface 521, opposing the first sliding surface 511. A low friction interface (mentioned previously) is provided between the first and second sliding surfaces 511, 521. Parts of the connector 5 forming the sliding surfaces 511, 521 may be formed from low friction materials. These materials may be the same low friction materials discussed above in relation to sliding. For example, the first sections 51a and 52a may preferably be formed from Nylon or PC.

As shown in FIG. 11, the first part of the connector 51 further comprises a first attachment part 512 on a side of the first sliding surface 511 opposite to the second sliding surface 521. The first attachment part 512 is configured to connect the first sliding surface 521 (and the connector 5) to a first part of the apparatus. The second part of the connector 52 comprises a second attachment part 522 on a side of the second sliding surface 521 opposite to the first sliding surface 511. The second attachment part 522 is configured to connect the second sliding surface 521 (and the connector 5) to a second part of the apparatus.

As shown in FIG. 11, the first part of the connector 51 is formed in two sections 51a, 51b, respectively arranged either side of a portion of the deformable material 53 forming the arms 531 for connection thereto. A first section 51a of the first part of the connector 51 may comprise the first sliding surface 511 and a second section 51b may comprise the attachment part 512. As shown in this specific example, the second part 51a and the attachment part 512 may be one and the same. Forming the connector 5 in this way may simplify assembly of the connector 5.

A slightly different arrangement is found of the second part of the connector 52 shown in FIG. 11. Similarly, the second part of the connector 52 is found in two portions 52a, 52b. Similarly, the first section 52a of the second part of the connector 52 may comprise the second sliding surface 521 and a second section 52b may comprise the attachment part 522. Similarly, the second part 52a and the attachment part 522 may be one and the same. However, the parts 52a, 52b are not necessarily respectively arranged either side of a portion of the arms 531, though they may be. Instead, the second section 52b may be provided directly on the first section 52a.

As in the example of FIG. 11, the first and second sections 51a, 51b of the first part 51 and may be connected by adhesive. Likewise, the first and second sections 51a, 51b of the first part 51 and may be connected by adhesive.

In the connector shown in FIGS. 11 and 12, the attachment parts 512, 522 may form part of a hook and loop (e.g. Velcro™) connection. Alternative connection mechanisms may be used in alternative examples, such as those described below.

The first sections 51a and 52a of the first and second parts 51 and 52, which include the sliding surfaces 521 and 522 respectively, may be formed from low friction materials. These materials may be the same low friction materials discussed above in relation to sliding. For example, the first sections 51a and 52a may preferably be formed from Nylon or PC. Forming the connector 5 this way may better enable relative movement between parts of an apparatus connected by the connector 5.

Although not seen from FIG. 11 both sliding surfaces 511, 512 are substantially circular in shape. However, other shapes are possible. For example, these may be square, generally equilateral, or substantially so in that they are about as long as they are wide. Alternative they may be an elongate shape, such as an oval, oblong or rectangle. As shown in FIG. 11, the first and second parts of the connector 51, 52 may different sizes, e.g. the first part may be larger than the second part. In alternative examples this may be reversed or the parts 51, 52 may be substantially the same size.

Figure 13:
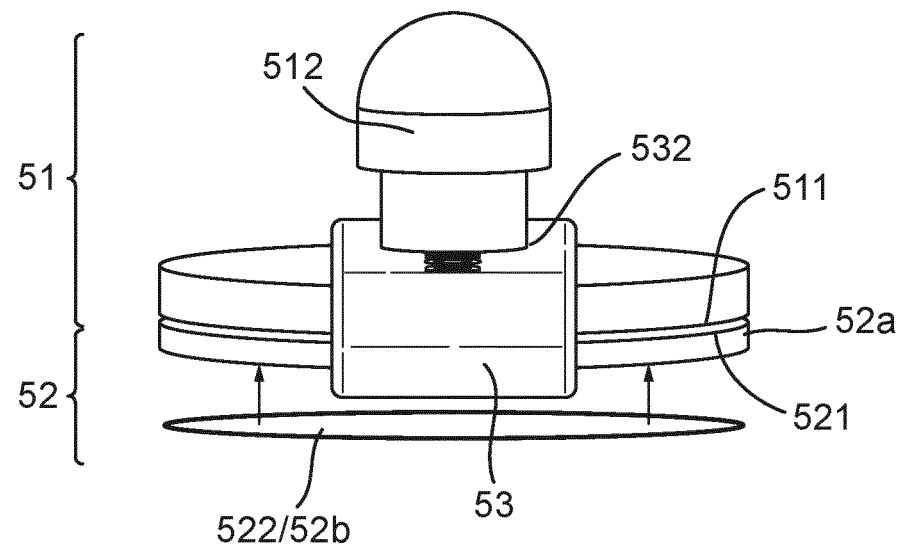
FIG. 13 shows a second example connector.

FIG. 13 shows a second example connector 5. This connector 5 is similar in many respects to the first example connector. For example, as shown in FIG. 13, the deformable material 53 is provided in the form of a strip, or band, and the deformable material 53 and second part of the connector 52 form a loop, as in the first example connector. Further, the second part of the connector 52 is substantially the same as in the first example connector. However, the second example connector 5 is differentiated from the first example connector by the following features.

As shown in FIG. 13, the first part 51 connector may be formed in one section, rather than two sections. Forming the connector 5 in this way may simplify manufacture. As shown, the first part 51 may comprise a protrusion configured to protrude though a portion 532 of the deformable material 53 forming the arms 531, for connection thereto. The portion 532 may comprise a through hole to accommodate the protrusion. This may simplify assembly of the connector 5. As shown in FIG. 13, the protrusion may form part of the first attachment part 512. The first attachment part may form part of a mechanical connection, such as a snap-fit connection and the attachment part 512 may be a snap-pin.

In alternative example connectors, the second attachment part 522 may alternatively form part of a mechanical connection, such as a snap-fit connection and the attachment part 522 may be a snap-pin.

Figure 14:
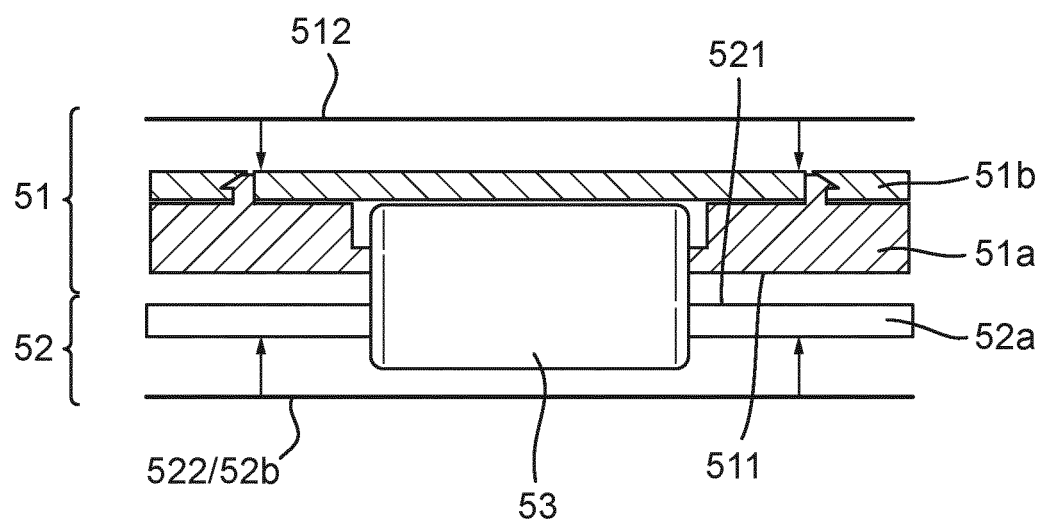
FIG. 14 shows a third example connector.

FIG. 14 shows a third example connector 5. This connector 5 is similar in many respects to the first example connector. For example, as shown in FIG. 14, the deformable material 53 is provided in the form of a strip, or band, and the deformable material 53 and second part of the connector 52 form a loop, as in the first example connector. Further, the second part of the connector 52 is substantially the same as in the first example connector. Further still, the first part of the connector 51 is formed in two sections 51a, 51b, respectively arranged either side of a portion of the arms 531 for connection thereto. However, the third example connector 5 is differentiated from the first example connector by the following features.

As shown in FIG. 14, the first and second sections 51a, 51b of the first part 51 may be connected by a mechanical connection, such as a snap-fit connection, rather than an adhesive. Alternative mechanical connections may be used on other examples, such as a threaded connection. The second section 51b still comprises the attachment part 512. Forming the connector 5 in this way may provide a relatively robust connector 5.

As shown, the attachment part 512 may be part of a hook and loop (Velcro™) connection. In alternative examples, an alternative attachment part may be used, such as one forming part of a mechanical connection, such as a snap-fit connection. The attachment part 512 may be a snap-pin, for example. As shown in FIG. 14, the attachment part 512 may be connected to the rest of the second section 51b by adhesive. This may simplify manufacture of the connector 5. Alternatively, the attachment part 512 may be integrally formed with the rest of the second section 51b. This may simplify assembly of the connector 5.

Figure 15:
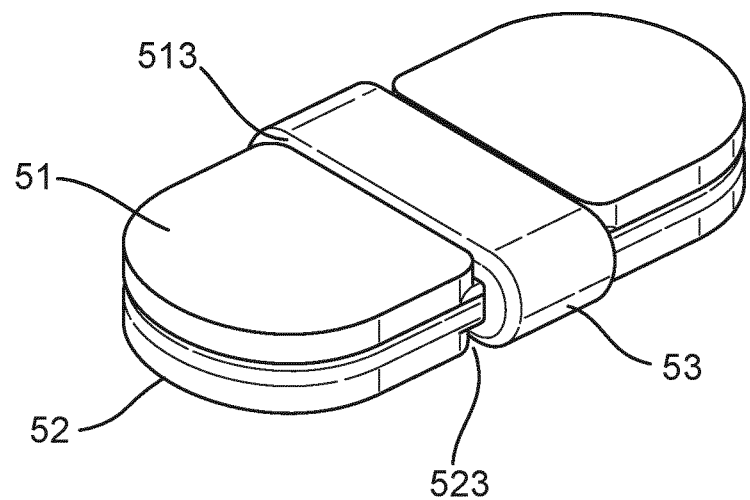
FIGS. 15 and 16 show a fourth example connector.
Figure 16:
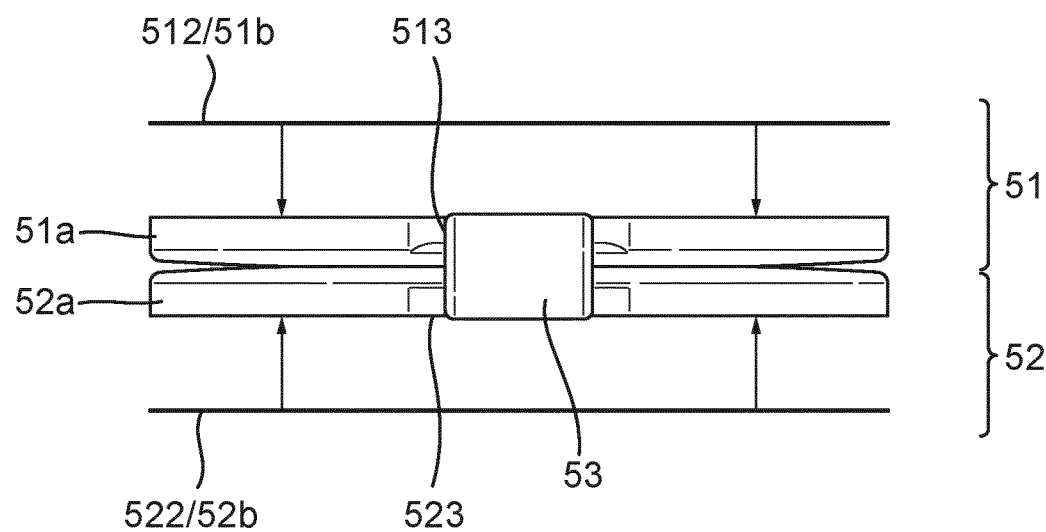

FIGS. 15 and 16 show a fourth example connector 5. Like the previous example connectors, the fourth example connector comprises a first part 51, a second part 52, opposing the first part 51. The connector 5 further comprises and two (or more) arms 531 extending between the first part 51 and the second part 52. The arms connect the first part 51 and the second part 52. The arms are formed from a deformable material 53 and are configured to deform to allow the first part 51 and the second part 52 to slide relative to each other at a low friction interface.

Like the previous example connectors, as shown in FIG. 15, which shows part of the connector of FIG. 16, the arms may be formed from a single piece of deformable material 53. The two (or more) arms may be joined to each other at an end at the first part of the connector 51 by a joining portion of the deformable material 53. In such an arrangement, the joined ends of the arms are not free ends of the deformable material 53, but are ends of the portions of the deformable material extending between the first and second parts 51, 52 of the connector 5, forming each of the arms 531. The exact positons of the joined ends is not particularly important and could be located at any point on the single piece of deformable material 53 located at the first part 51 of the connector.

Differently to the previous example connectors, as shown in FIG. 15, the two (or more) arms may be joined to each other also at an end at the second part of the connector 52 by a joining portion of the deformable material 53. In such an arrangement, these joined ends of the arms also are not free ends of the deformable material 53, but are ends of the portions of the deformable material extending between the first and second parts 51, 52 of the connector 5, forming each of the arms 531. The exact positons of these joined ends is also not particularly important and could be located at any point on the single piece of deformable material 53 located at the second part 52 of the connector. Forming the connector 5 in this way may simplify manufacture of the connector.

As shown in FIG. 15, the above arrangement may be embodied by a loop formed from the deformable material 53 (i.e. alone). This loop may form a single unit, to be connected to the first part of the connector 51 and the second part of the connector 52. The loop may be substantially flat, in other words longer in a direction parallel to the sliding surfaces 511, 512 than in the depth direction perpendicular thereto. The loop may also be substantially narrow, i.e. longer in the extension direction of the arms than in their width direction.

Like the previous example connectors, as shown in FIG. 16, the first part of the connector 51 comprises a first sliding surface 511 and the second part of the connector 52 comprises a second sliding surface 521, opposing the first sliding surface 511. A low friction interface is provided between the first and second sliding surfaces 511, 521. Parts of the connector 5 forming the sliding surfaces 511, 521 may be formed from low friction materials. These materials may be the same low friction materials discussed above in relation to sliding. For example, the first sections 51a and 52a may preferably be formed from Nylon or PC.

As shown in FIG. 16, the first part of the connector 51 further comprises a first attachment part 512 on a side of the first sliding surface 511 opposite to the second sliding surface 521. The first attachment part 512 is configured to connect the first sliding surface 521 (and the connector 5) to a first part of the apparatus. The second part of the connector 52 comprises a second attachment part 522 on a side of the second sliding surface 521 opposite to the first sliding surface 511. The second attachment part 522 is configured to connect the second sliding surface 521 (and the connector 5) to a second part of the apparatus.

As shown in FIG. 16, the first part of the connector 51 is formed in two sections 51a, 51b, respectively arranged either side of a portion of the deformable material 53 forming the arms 531, for connection thereto. A first section 51a of the first part of the connector 51 may comprise the first sliding surface 511 and a second section 51b may comprise the attachment part 512. As shown in this specific example, the second part 51a and the attachment part 512 may be one and the same. An identical arrangement is found for the second part of the connector 52, as shown in FIG. 16.

As shown in FIGS. 15 and 16, the first and second parts of the connector 51, 52 (e.g. the first sections thereof 51a, 52a) may comprise respective channels 513, 523 configured to accommodate a portion of the deformable material 53 forming the arms 531, for connection thereto. In other words, the loop formed by the deformable material may be retained in the channels 513, 523. Forming the connector 5 in this way may provide a more robust connector 5.

As in the example of FIG. 16, the first and second sections 51a, 51b of the first part 51 and may be connected by adhesive. Although in alternative examples, a different connection means may be used, such as the mechanical connection described in relation to the third example connector of FIG. 14.

In the connector shown in FIG. 16, the attachment parts 512, 522 may form part of a hook and loop (e.g. Velcro™) connection. Alternative connection mechanisms may be used in alternative examples, such as a mechanical connection like a snap-pin.

The first sections 51a and 52a of the first and second parts 51 and 52, which include the sliding surfaces 521 and 522 respectively, may be formed from low friction materials. These materials may be the same low friction materials discussed above in relation to sliding. For example, the first sections 51a and 52a may preferably be formed from Nylon or PC.

As shown in FIG. 15, both sliding surfaces 511, 512 have a substantially elongate shape. The elongate shape may be oval, as shown, or rectangular. However, other shapes are possible. For example, these may be circular, square, generally equilateral, or substantially so in that they are about as long as they are wide. Particularly in the case of elongate shaped parts, in some example connectors, the first and or second parts of the connector 51, 52 may comprise multiple attachment parts, e.g. at either end of the elongate shaped parts. For example two-snap pins may be provided at opposing ends of elongate shaped parts. Forming the connector in this way may enable more secure attachment to an apparatus.

As shown in FIG. 11, the first and second parts of the connector 51, 52 may the same size. In alternative examples the parts 51, 52 may be substantially different size, e.g. the first part larger than the second part or vice versa.

Figure 17:
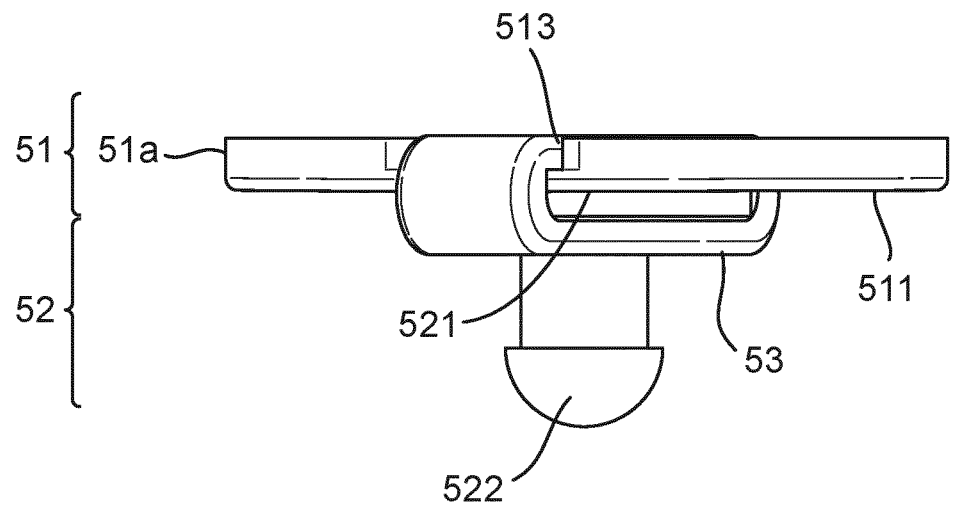
FIG. 17 shows a fifth example connector.

FIG. 17 shows a fifth example connector 5. The deformable material is a loop, like in the fourth example connector and the first part 51 of the fifth example connector is the same as the first part of the fourth example connector. However, the second part of the connector 52 is the same as the first part of the second example connector. In other words, as shown in FIG. 17, the second part of the connector 52 may be formed in one section, rather than two sections. As shown, the second part 52 may comprise a protrusion configured to protrude though a portion 532 of the deformable material 53 forming the arms 531, for connection thereto. The portion 532 may comprise a through hole to accommodate the protrusion. As shown in FIG. 17, the protrusion may form part of the first attachment part 512. The first attachment part 512 may form part of a mechanical connection, such as a snap-fit connection and the attachment part 512 may be a snap-pin.

Figure 18:
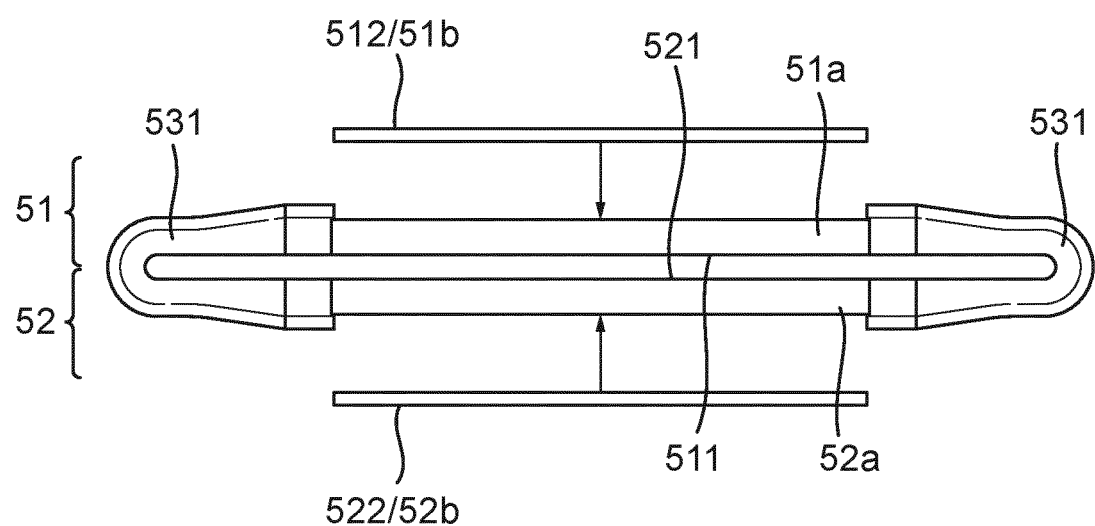
FIG. 18 shows a sixth example connector.

FIG. 18 shows a sixth example connector. The first and second parts 51 and 52 of this example connector may each be substantially the same as the second part of the first example connector. As shown in FIG. 17, the arms 531 may be joined to the second part 52 of the connector 5 at an end at the second part of the connector 52 and joined to the first part 51 of the connector 5 at an end at the first part of the connector 51. In such an arrangement, the ends of the arms 531 are free ends of the deformable material 53. These joined ends may be joined to the first and second parts of the connector 51, 52 in any suitable way. In some preferable examples, the deformable material 53 forming the arms 531 may be integrated, e.g. co-moulded with the second part of the connector 52. In other examples, the arms 531 may be joined to the second part of the connector 52 by an adhesive.

Accordingly, each of the arms 531 may substantially consist of C-shaped portion of a deformable material 53. Forming the connector 5 in this way may simplify assembly of the connector 5.

Figure 19:
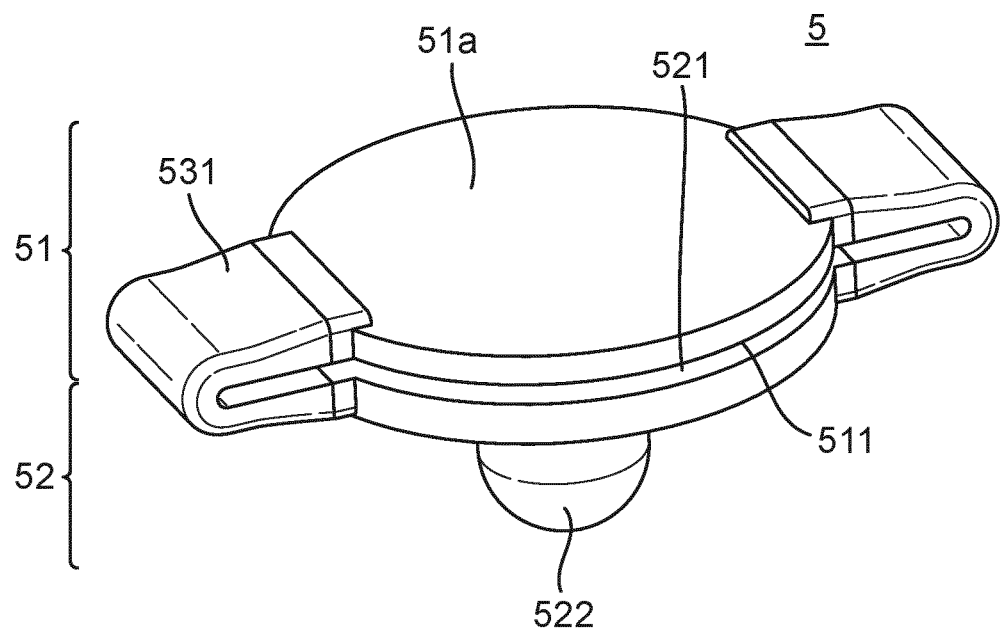
FIGS. 19 and 20 show a seventh example connector.
Figure 20:
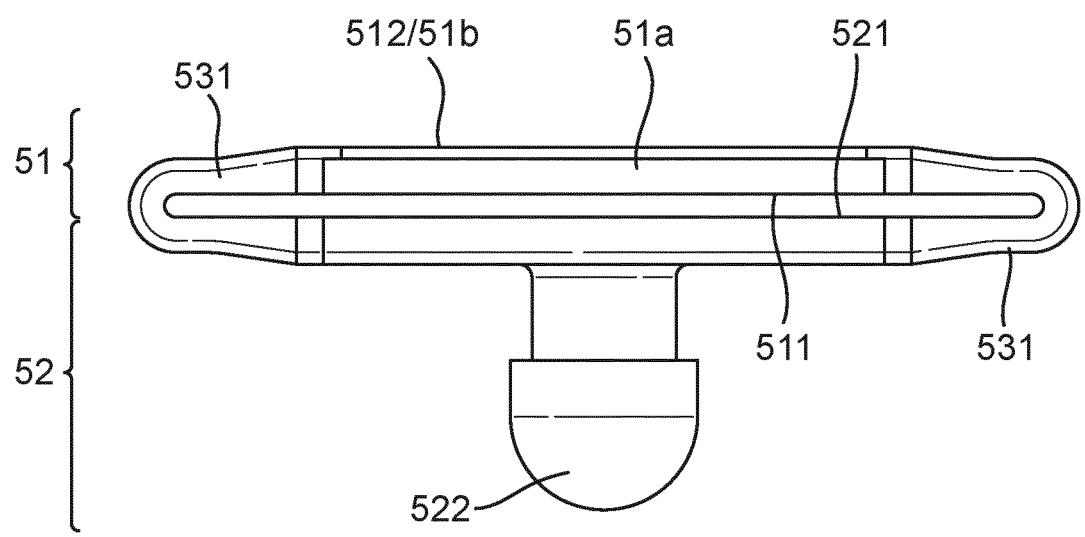

FIGS. 19 and 20 show a seventh example connector 5. This example connector 5 is similar to the sixth example connector, in that the arms 531 may be joined to the second part 52 of the connector 5 at an end at the second part of the connector 52 and joined to the first part 51 of the connector 5 at an end at the first part of the connector 51. However, as shown in FIGS. 19 and 20, the second attachment part 522 may form part of a mechanical connection, such as a snap-fit connection, e.g. the attachment part 522 may be a snap-pin. Further, as shown, the second part 52 of the connector 5 may be formed in one section.

Figure 21:
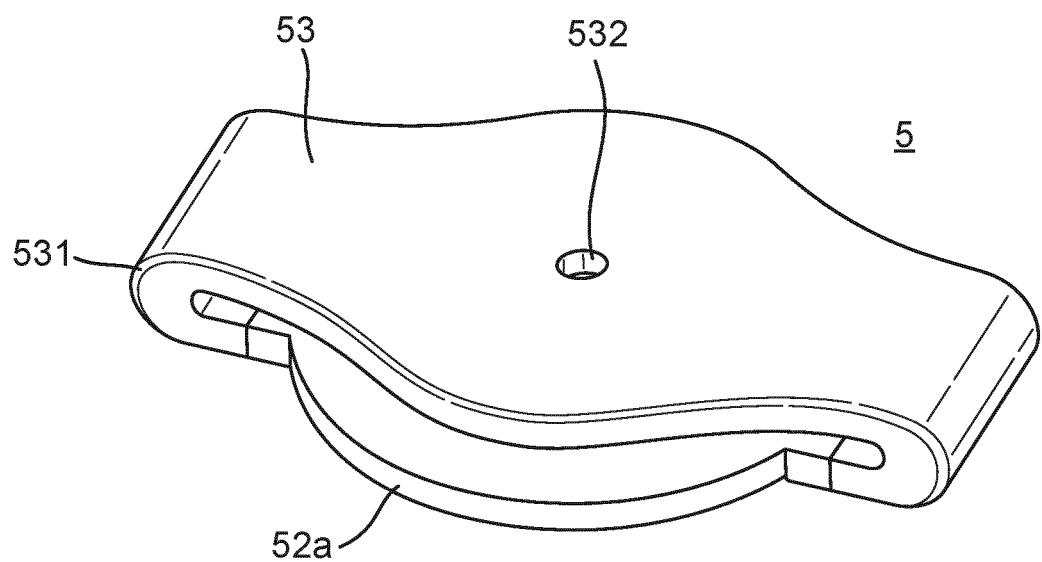
FIG. 21 shows an eight example connector.

FIG. 21 shows an eighth example connector 5. The example connector 5 is a variation of the second example connector shown in FIG. 13. The main difference is that the deformable material 53 of the eight example connector becomes wider at the region opposite the section 52a such that the section 52a covers the covers the base portion of the snap-pin 512 (not shown in FIG. 21).

Figure 22:
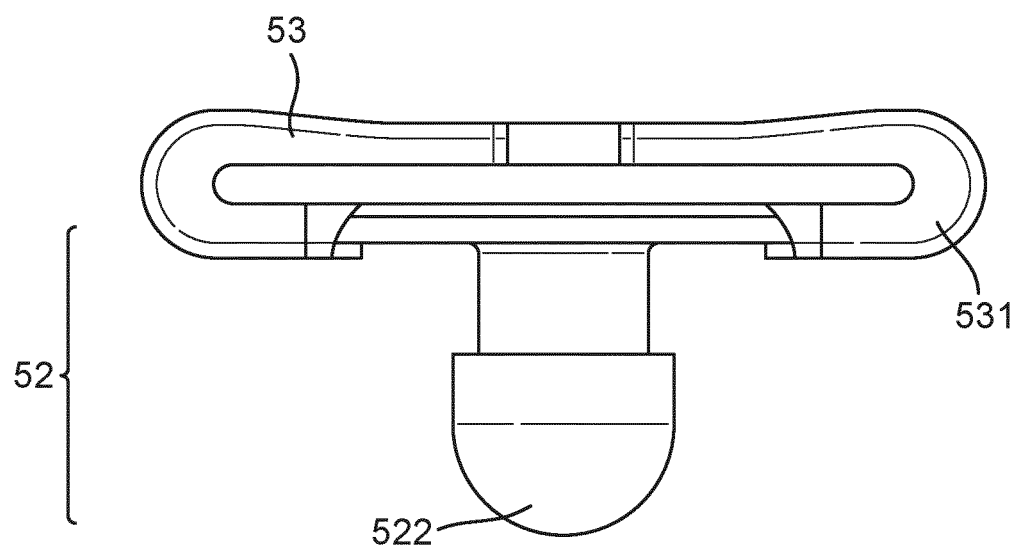
FIGS. 22, 23 and 24 show a ninth example connector.
Figure 23:
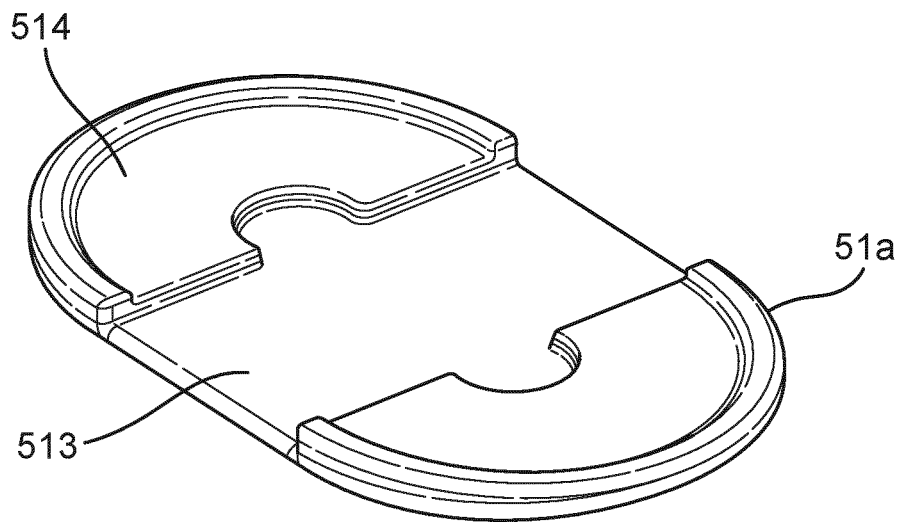
Figure 24:
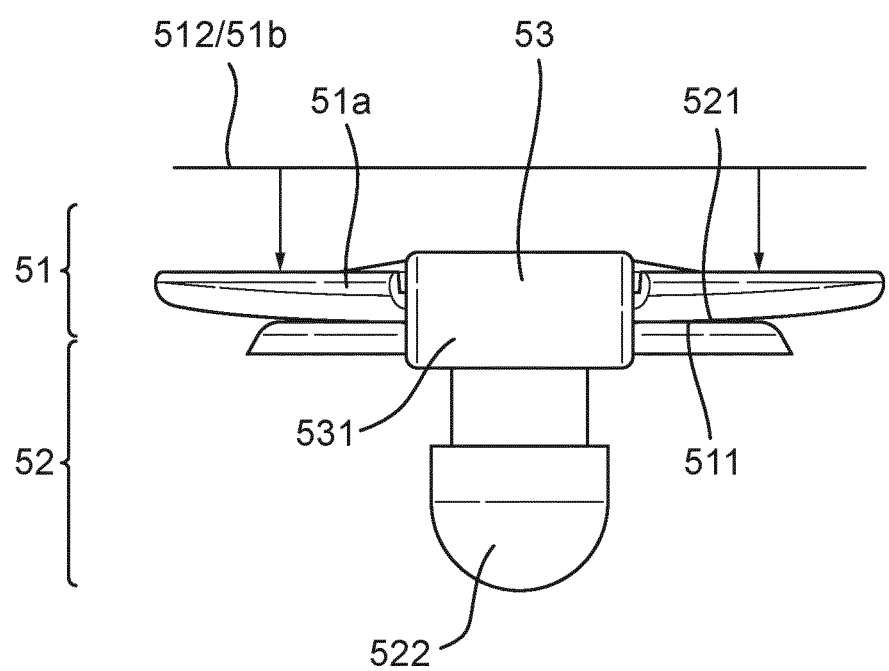

FIGS. 22 to 24 show a ninth example connector 5. In this example connector 5, the second attachment part 522 may form part of a mechanical connection, such as a snap-fit connection, e.g. the attachment part 522 may be a snap-pin. Further, as shown, the second part 52 of the connector 5 may be formed in one section. In this example connector, as shown in FIG. 22, the deformable material 53 is provided in the form of a strip, or band, and the deformable material 53 and second part of the connector 52 form a loop.

As shown in FIG. 24, first part of the connector 51 is formed in two sections 51a, 51b, respectively arranged either side of a portion of the deformable material 53 forming the arms 531, for connection thereto. A first section 51a of the first part of the connector 51 may comprise the first sliding surface 511 and a second section 51b may comprise the attachment part 512. As shown in this example, the second part 51a and the attachment part 512 may be one and the same.

As shown in further detail in FIG. 23, the first section 51a may comprise a channel 513 configured to accommodate a portion of the deformable material 53 forming the arms 531, for connection thereto. In other words, the loop formed by the deformable material may be retained in the channel 513. Forming the connector 5 in this way may provide a more robust connector 5. Portions of the first section 51 either side of the channel 513 may comprise a recess 514 for accommodating the second section 51b. This may give the connector 5 a low profile. As shown the, first section 51a may be substantially ovoid in shape.

In each of the example connectors described, opposing first and second sliding surface 511, 512 are configured to slide against each other, while the arms 531 formed from the deformable material 53 deform to enable said sliding, while connecting the first and second parts of the connector together. When the first and second attachment parts 512 and 522 are connected to respective parts of an apparatus, the connector thus enables relative movement between the apparatus parts, while connecting the first and second apparatus parts.

It should be understood that features of each of the above example connectors may be combined or exchanged in alternative examples not shown. For example, different combinations of the first and second parts of the connectors described above may be used together, and/or these parts may be interchanged.

Variations of the above described examples are possible in light of the above teachings. It is to be understood that the invention may be practiced otherwise and specifically described herein without departing from the spirit and scope of the invention.

The invention claimed is:

1. A connector for connecting first and second parts of an apparatus, comprising:
   a first part;
   a second part, opposing the first part; and
   two, or more, arms extending between the first part and the second part connecting the first part and the second part, the arms being formed from a deformable material and configured to deform to allow the first part and the second part to slide relative to each other at a low friction interface;
   the first part comprising a first sliding surface;
   the second part comprising a second sliding surface, opposing the first sliding surface,
   the low friction interface being provided between the first and second sliding surfaces;
   the first part comprising a first attachment part on a side of the first sliding surface opposite to the second sliding surface, configured to connect the first sliding surface to the first part of the apparatus;
   the second part comprising a second attachment part on a side of the second sliding surface opposite to the first sliding surface, configured to connect the second sliding surface to the second part of the apparatus.

2. The connector according to claim 1, wherein the two or more arms are formed from different pieces of deformable material and are joined to the first part of the connector and to the second part of the connector.

3. The connector of claim 1, wherein the two or more arms are formed from a single piece of deformable material, and are joined to each other by a joining portion of the deformable material at respective ends at the first part of the connector.

4. The connector of claim 3, wherein the arms are joined to the second part of the connector at respective ends at the second part of the connector.

5. The connector of claim 3, wherein the two or more arms are joined to each other by a joining portion of the deformable material also at respective ends at the second part of the connector, forming a loop of the deformable material.

6. The connector of claim 1, wherein at least one of the first part and the second part of the connector are formed in two sections, respectively arranged either side of a portion of the deformable material forming the arms, for connection thereto, a first section comprising the sliding surface and a second section comprising the attachment part.

7. The connector, of claim 6, wherein the two sections are connected by adhesive.

8. The connector of claim 6, wherein the two sections are connected by a mechanical connection, wherein optionally the mechanical connection is a snap-fit connection.

9. The connector of claim 1, wherein at least one of the first part and the second part of the connector comprises a channel configured to accommodate a portion of the deformable material forming the arms, for connection thereto.

10. The connector of claim 1, wherein at least one of the first part and the second part of the connector comprises a protrusion configured to protrude though a portion of the deformable material forming the arms, for connection thereto, wherein optionally the protrusion forms part of the attachment part.

11. The connector of claim 1, wherein at least one of the first and second sliding surfaces has a substantially circular or substantially equilateral shape.

12. The connector of claim 1, wherein at least one of the first and second sliding surfaces has a substantially elongate shape.

13. The connector of claim 1, wherein the first and second parts are substantially the same size.

14. The connector of claim 1, wherein the first and second parts are substantially different sizes.

15. The connector of claim 1, wherein at least one of the first and second attachment parts forms part of a hook and loop connection.

16. The connector of claim 1, wherein at least one of the first and second attachment parts forms part of a mechanical connection, wherein optionally the mechanical connection is a snap-fit connection.

17. An apparatus comprising:
 a first part;
 a second part; and
 the connector of claim 1, connecting the first part and the second part.

18. The apparatus of claim 17, wherein the first and second part of the apparatus are configured to move relative to each other, said relative movement being enabled by the first part and the second part of the connector sliding relative to each other.

19. The apparatus of claim 17, wherein at least one of the first part and the second part of the apparatus comprises a protective layer, optionally an energy absorbing layer or a hard shell, configured to protect against an impact to the apparatus, wherein optionally one of the first and second parts comprises an interface layer configured to interface with an object or person to be protected.

20. The apparatus of claim 17, wherein the apparatus is a helmet or body armor.

* * * * *